US010911990B2

(12) United States Patent
Ying et al.

(10) Patent No.: US 10,911,990 B2
(45) Date of Patent: Feb. 2, 2021

(54) NETWORK HANDOVER METHOD AND RELATED DEVICE

(71) Applicant: Huawei Technologies Co., Ltd., Shenzhen (CN)

(72) Inventors: Jiangwei Ying, Beijing (CN); Yanmei Yang, Beijing (CN); Zhenglei Huang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/503,890

(22) Filed: Jul. 5, 2019

(65) Prior Publication Data

US 2019/0335365 A1    Oct. 31, 2019

Related U.S. Application Data

(63) Continuation of application No. PCT/CN2017/070512, filed on Jan. 6, 2017.

(51) Int. Cl.
*H04W 36/00* (2009.01)
*H04W 36/10* (2009.01)
(Continued)

(52) U.S. Cl.
CPC ....... *H04W 36/0022* (2013.01); *H04W 36/10* (2013.01); *H04W 36/14* (2013.01); *H04W 36/32* (2013.01)

(58) Field of Classification Search
CPC ..... H04W 36/14; H04W 36/10; H04W 36/32; H04W 36/0022
See application file for complete search history.

(56) References Cited

U.S. PATENT DOCUMENTS

2008/0316972 A1   12/2008   Shaheen
2011/0092213 A1   4/2011   Forsberg et al.
(Continued)

FOREIGN PATENT DOCUMENTS

CN   101043705 A   9/2007
CN   101282582 A   10/2008
(Continued)

OTHER PUBLICATIONS

Machine Translation and Abstract of Chinese Publication No. CN101282582, Oct. 8, 2008, 25 pages.
(Continued)

*Primary Examiner* — Brian D Nguyen
(74) *Attorney, Agent, or Firm* — Conley Rose, P.C.

(57) ABSTRACT

A network handover method and a related device, where the method includes: when receiving a user terminal handover request that is sent by a source radio access network node and that carries a target base station identifier, determining, by a source mobility management function entity based on the target base station identifier, to trigger an inter-Radio Access Technology (RAT) network handover; sending a first message to a source session management function entity; receiving a second message sent by the source session management function entity, where the second message includes a session management context; and sending a relocation request to a target mobility management function entity, where the relocation request is used to instruct the target mobility management function entity to perform inter-RAT network handover on the user terminal.

19 Claims, 22 Drawing Sheets

(51) Int. Cl.
*H04W 36/14* (2009.01)
*H04W 36/32* (2009.01)

(56) References Cited

U.S. PATENT DOCUMENTS

| | | | |
|---|---|---|---|
| 2013/0195268 A1* | 8/2013 | Norrman | H04W 36/0038 380/247 |
| 2014/0153547 A1 | 6/2014 | Klingenbrunn et al. | |
| 2016/0183156 A1* | 6/2016 | Chin | H04L 61/2007 370/331 |
| 2017/0034749 A1* | 2/2017 | Chandramouli | H04W 36/14 |
| 2017/0289019 A1* | 10/2017 | Faccin | H04W 36/30 |
| 2017/0332301 A1* | 11/2017 | Horn | H04W 36/14 |
| 2018/0184297 A1* | 6/2018 | Mohamed | H04W 12/06 |
| 2018/0227978 A1* | 8/2018 | Keller | H04W 36/0022 |
| 2020/0059989 A1* | 2/2020 | Velev | H04W 8/08 |

FOREIGN PATENT DOCUMENTS

| | | |
|---|---|---|
| CN | 101394657 A | 3/2009 |
| CN | 101483900 A | 7/2009 |
| CN | 102067642 A | 5/2011 |
| CN | 103327548 A | 9/2013 |

OTHER PUBLICATIONS

Machine Translation and Abstract of Chinese Publication No. CN101483900, Jul. 15, 2009, 15 pages.

"3rd Generation Partnership Project; Technical Specification Group Services and System Aspects; Study on Architecture for Next Generation System (Release 14)," 3GPP TR 23.799 V14.0.0, Dec. 2016, 522 pages.

Huawei, et al., "Clarification on the Service based interface," S2-166489, SA WG2 Meeting #118, Nov. 14-18, 2016, Reno, Nevada, 15 pages.

Nokia, et al., "Resolving editor's notes in Solution 182," S2-167077, revision of S2-166445, 7073, SA WG2 Meeting #118, Nov. 14-18, 2016, Reno, NV, 14 pages.

Foreign Communication From a Counterpart Application, PCT Application No. PCT/CN2017/070512, English Translation of International Search Report dated Sep. 28, 2017, 2 pages.

Machine Translation and Abstract of Chinese Publication No. CN101043705, Sep. 26, 2007, 23 pages.

Machine Translation and Abstract of Chinese Publication No. CN101394657, Mar. 25, 2009, 15 pages.

Foreign Communication From a Counterpart Application, Chinese Application No. 201780004564.4, Chinese Office Action dated Jan. 21, 2020, 45 pages.

Huawei, et al., "Clarification on the Service based Interface," SA WG2 Meeting #118, S2-167183, Nov. 14-18, 2016, 11 pages.

Huawei "Interim agreement on HO and TAU principles," SA WG2 Meeting #118, S2-166674, Nov. 14-18, 2016, 8 pages.

Samsung, et al., "Interim agreement for handover," SA WG2 Meeting#118, S2-167096, Nov. 14-18, 2016, 2 pages.

Foreign Communication From a Counterpart Application, European Application No. 17890132.8, Extended European Search Report dated Jan. 15, 2020, 10 pages.

Nokia, et al., "Reply to SM and MM decoupling," S2-165642, 3GPP TSG-SA WG2#117, S2-165911, Oct. 21, 2016, 6 pages.

* cited by examiner

NETWORK HANDOVER METHOD AND RELATED DEVICE

CROSS-REFERENCE TO RELATED APPLICATIONS

This application is a continuation of International Patent Application No. PCT/CN2017/070512, filed on Jan. 6, 2017, the disclosure of which is hereby incorporated by reference in its entirety.

TECHNICAL FIELD

This application relates to the field of wireless network technologies, and in particular, to a network handover method and a related device.

BACKGROUND

To support Long Term Evolution (LTE) on a wireless side, the 3rd Generation Partnership Project (3GPP) starts to study System Architecture Evolution (SAE) on a network side in December 2004. LTE and SAE jointly constitute an evolved packet system (EPS). In an EPS network architecture, end-to-end all-Internet Protocol (IP) networking and a flattened network structure are used, and compatibility with an existing 2G/3G network is fully considered.

As shown in FIG. 1, FIG. 1 is a schematic structural diagram of an EPS network architecture. An evolved universal terrestrial radio access network (E-UTRAN) is a network including a plurality of evolved NodeBs (eNBs), and is mainly responsible for a radio physical layer function, resource scheduling and radio resource management, radio access control, and mobility management. An eNB is connected to a serving gateway (S-GW) using a user plane interface S1-U, to transmit user data; and is connected to a mobility management entity (MME) using a control plane interface S1-MME, to implement a function such as radio access bearer control using the S1-AP protocol. The MME is mainly responsible for all control plane functions in user session management, including non-access stratum (NAS) signaling and security, tracking area management, selection of a packet data network (PDN) gateway (P-GW) and an S-GW, and the like. The S-GW is mainly responsible for user equipment (UE) data transmission and forwarding, route switching, and the like, and serves as a local mobility anchor point when a user equipment is handed over between eNBs (only one S-GW provides the user equipment with a service at each moment). The P-GW serves as an anchor point for a PDN connection, and is responsible for user equipment IP address allocation, UE data packet filtering, rate control, charging information generation, and the like.

In an existing LTE network, when a location of UE changes due to movement, a radio signal in a cell in which the UE is currently located becomes weak, but a radio signal in a neighboring cell becomes strong. In this case, network handover needs to be performed on the UE in the network. The network handover includes inter-Radio Access Technology (RAT) network handover, for example, an inter-RAT handover between $2^{nd}$ Generation (2G), $3^{rd}$ Generation (3G), and $4^{th}$ Generation (4G). An inter-RAT handover process not only includes mobility management context (MM context) mapping (switching between UE contexts in 3G and 4G) and mobility management context transfer (transfer from a source Mobility Management Entity (MME)/source Serving General Packet Radio Service (GPRS) Support Node (SGSN) to a target SGSN/target MME), but also includes communication bearer establishment and cancellation. Network entities responsible for mobility management (MM) and session management (SM) are an MME entity and an S-GW entity. A control plane and a data plane for SM are not separated. To be specific, both the control plane and the data plane need to be managed by a P-GW function entity and an S-GW function entity.

However, with development of mobile communications technologies, many innovative applications are certainly brought for various industries, and mobile broadband, multimedia, machine-type communication, industrial control, and an intelligent transportation system become main use cases in the $5^{th}$ Generation (5G) era. To meet greatly changed service requirements, a 5G network is constructed in a flexible manner. A potential direction is network function separation. That is, a control plane (CP) function and a user plane (UP) function are separated, and an Access and Mobility Management function (AMF) and a Session Management Function (SMF) in a CP are separated.

In a 5G network, network slicing means that a physical network is sliced into a plurality of virtual end-to-end networks. Each virtual network, including a device, access, transmission, and a core network in the network, is logically independent. Each network slice is constituted by instantiating an independent network function or a function combination, has a different function and feature, and faces a requirement and a service that are different from those faced by another network slice. Separation of network slices enables different users and user groups to define and customize network capabilities flexibly and dynamically based on different application scenarios and requirements of the users and user groups, and the network slices do not affect each other. A network slice includes a control plane function (CPF) entity and a user plane function (UPF) entity. The CPF entity includes an access and mobility management function (AMF,) entity and a session management function (SMF) entity. The AMF is mainly responsible for completing a mobility management (MM) such as device access authentication, security encryption, and location registration. The SMF is mainly responsible for completing session management (SM) such as establishment, release, and change of a user plane transmission path. The UPF entity is mainly responsible for completing routing and forwarding of user plane data.

FIG. 2 is a schematic architectural diagram of a network slice. A plurality of network slices share only some specific CPF entities (such as AMF entities). In addition, each network slice has some independent CPF entities (such as SMF entities) and independent UPF entities. In addition, a plurality of SMFs and UPF functions exist in the network, and a universal mobility management entity (such as an AMF) is shared. There is a signaling interface between a radio access network (RAN) and the AMF. There is a data plane interface between an RAN node and a UPF. There is a signaling interface between a user data database and the AMF. There is a signaling interface between the user data database and an SMF. There is further a signaling interface between the AMF and an SMF in each slice. There is no direct interface between the RAN and the SMF, and signaling between the RAN and the SMF needs to be forwarded using the AMF.

However, in an existing 3G/4G network architecture, a same network function node, such as an MME/SGSN, is responsible for an SM function and an MM function. Because an AMF and an SMF are separated in 5G, when inter-RAT network handover is performed between 5G and 4G, a new inter-RAT handover procedure needs to be designed to ensure service data continuity.

SUMMARY

This application provides a network handover method and a related device, in order to resolve a data continuity problem caused during inter-RAT network handover.

According to a first aspect, this application provides a network handover method, including the following.

A source radio access network node first sends, to a source mobility management function entity, a user terminal handover request that carries a target base station identifier. After receiving the handover request, the source mobility management function entity determines, based on the target base station identifier, to trigger an inter-RAT network handover. Then the source mobility management function entity sends a first message to a source session management function entity. The source session management function entity returns a second message to the source mobility management function entity, where the second message includes a session management context. After receiving the second message, the source mobility management function entity sends a relocation request to a target mobility management function entity. The target mobility management function entity performs the inter-RAT network handover on a user terminal based on the relocation request. In this way, in a scenario in which a CP function and a UP function are separated, and an AMF and an SMF in a CP are separated, successful execution of the inter-RAT network handover is ensured, and data service continuity is ensured.

In a possible design, the relocation request carries the target base station identifier, a terminal identifier of the user terminal, the session management context, and a mobility management context.

In another possible design, the first message includes the target base station identifier, and the target base station identifier is used by the source session management function entity to determine that this operation is the inter-RAT network handover.

In another possible design, the first message further includes a target network access type and/or an inter-RAT network handover indication, and the target network access type and/or the inter-RAT network handover indication are/is used by the source session management function entity to determine that this operation is the inter-RAT network handover.

In another possible design, the relocation request includes the mobility management context of the user terminal, and the mobility management context is a mobility management context of a target system. Additionally, before sending the relocation request to the target mobility management function entity, the source mobility management function entity obtains a mobility management context of a source system of the user terminal, and maps the mobility management context of the source system into the mobility management context of the target system.

According to a second aspect, this application provides a network handover method, including the following.

A source radio access network node first sends, to a source mobility management function entity, a user terminal handover request that carries a target base station identifier. After receiving the handover request, the source mobility management function entity determines, based on the target base station identifier, to trigger an inter-RAT network handover. Then the source mobility management function entity sends a first message to a source session management function entity. The source session management function entity returns a second message to the source mobility management function entity, where the second message includes a session management context. After receiving the second message, the source mobility management function entity sends a relocation request to a target mobility management function entity. The target mobility management function entity performs the inter-RAT network handover on a user terminal based on the relocation request. In this way, in a scenario in which a CP function and a UP function are separated, and an AMF and an SMF in a CP are separated, successful execution of the inter-RAT network handover is ensured, and data service continuity is ensured.

In a possible design, the first message carries the target base station identifier. Optionally, the source session management function entity determines, based on the target base station identifier, that this operation is an inter-RAT handover.

In another possible design, the first message further includes a target network access type and/or an inter-RAT network handover indication, and the target network access type and/or the inter-RAT network handover indication are/is used by the source session management function entity to determine that this operation is the inter-RAT network handover.

In another possible design, the second message includes the session management context of the user terminal, and the session management context is a session management context of a target system. Additionally, before the source session management function entity sends the second message to the source mobility management function entity, the source session management function entity first obtains a session management context of a source system of the user terminal, and then maps the session management context of the source system into the session management context of the target system.

According to a third aspect, this application provides a network handover method, including the following.

After receiving a user terminal handover request that is sent by a source base station and that carries a network identifier of a target radio access network node, a source mobility management function entity determines, based on the network identifier of the target radio access network node, to trigger an inter-RAT network handover. The source mobility management function entity then sends a relocation request to a target mobility management function entity. After receiving the relocation request, the target mobility management function entity sends a session management context to a target session management function entity. After receiving the session management context, the target session management function entity sends a session connection establishment request to the target mobility management function entity. After receiving the session connection establishment request, the target mobility management function entity sends the session connection establishment request to the target radio access network node, where the connection establishment request is used to instruct the target radio access network node to establish a data transmission channel with a core network user plane function entity. In this way, in a scenario in which a CP function and a UP function are separated, and an AMF and an SMF in a CP are separated, successful execution of the inter-RAT network handover is ensured, and data service continuity is ensured.

In a possible design, after the target mobility management function entity receives the session connection establishment request sent by the target session management function entity, the target mobility management function entity sends, to the target radio access network node, a handover request that carries the session connection establishment request. Alternatively, the target mobility management function entity sends a handover request to the target radio access network node, and sends the session connection establishment request to the target radio access network node, where the two requests are two different messages, and the handover request is used to instruct the target radio access network node to perform an inter-RAT network handover on a user terminal.

In another possible design, the relocation request carries a terminal identifier of the user terminal, the network identifier of the target radio access network node, and context information of the user terminal, where the context information of the user terminal includes a mobility management context and the session management context.

In another possible design, after the target mobility management function entity receives the relocation request sent by the source mobility management function entity, the target mobility management function entity sends the terminal identifier of the user terminal and the network identifier of the target radio access network node to the target session management function entity.

In another possible design, after the target mobility management function entity receives the relocation request sent by the source mobility management function entity, the target mobility management function entity sends an inter-RAT network handover indication and/or a target network access type to the target session management function entity, where the inter-RAT network handover indication and/or the target network access type are/is used by the target session management function entity to determine that this operation is the inter-RAT network handover.

In another possible design, the session connection establishment request carries a session identifier and/or first data channel information, and the first data channel information is used to establish the data transmission channel between the core network user plane function entity and the target radio access network node.

In another possible design, after the target mobility management function entity sends the session connection establishment request to the target radio access network node, the target mobility management function entity receives a session connection establishment response sent by the target radio access network node, where the session connection establishment response carries a session identifier and/or second data channel information. The second data channel information is used to establish the data transmission channel between the core network user plane function entity and the target radio access network node.

In another possible design, after the target mobility management function entity sends the handover request to the target radio access network node, the target mobility management function entity receives a handover complete notification sent by the target radio access network node. The handover complete notification includes a session management message, which carries a session identifier and/or second data channel information, where the second data channel information is used to establish the data transmission channel between the core network user plane function entity and the target radio access network node. Additionally, the target mobility management function entity sends the session management message to the target session management function entity.

In another possible design, the relocation request includes a mobility management context of the user terminal, and the mobility management context is a mobility management context of a source system. Additionally, after the target mobility management function entity receives the relocation request sent by the source mobility management function entity, the target mobility management function entity maps the mobility management context of the source system into a mobility management context of a target system.

According to a fourth aspect, this application provides a network handover method, including the following.

After receiving a user terminal handover request that is sent by a source base station and that carries a network identifier of a target radio access network node, a source mobility management function entity determines, based on the network identifier of the target radio access network node, to trigger an inter-RAT network handover, and sends a relocation request to a target mobility management function entity. After receiving the relocation request, the target mobility management function entity sends a session management context to a target session management function entity. After receiving the session management context, the target session management function entity sends a session connection establishment request to the target mobility management function entity. After receiving the session connection establishment request, the target mobility management function entity sends the session connection establishment request to the target radio access network node, where the connection establishment request is used to instruct the target radio access network node to establish a data transmission channel with a core network user plane function entity. In this way, in a scenario in which a CP function and a UP function are separated, and an AMF and an SMF in a CP are separated, successful execution of the inter-RAT network handover is ensured, and data service continuity is ensured.

In a possible design, before the target session management function entity sends the session connection establishment request to the target mobility management function entity, the target mobility management function entity forwards the session connection establishment request to the target radio access network node, and the target session management function entity receives a terminal identifier of a user terminal and the network identifier of the target radio access network node that are sent by the target mobility management function entity. Optionally, the target session management function entity determines, based on the network identifier of the target radio access network node, that this operation is the inter-RAT network handover.

In another possible design, before the target session management function entity sends the session connection establishment request to the target mobility management function entity, the target mobility management function entity forwards the session connection establishment request to the target radio access network node, and the target session management function entity receives an inter-RAT network handover indication and/or a target network access type that are/is sent by the target mobility management function entity. The inter-RAT network handover indication and/or the target network access type are/is used by the target session management function entity to determine that this operation is the inter-RAT network handover.

In another possible design, after the target session management function entity receives the session management context sent by the target mobility management function entity, the target session management function entity determines, based on at least one of the network identifier of the target radio access network node, the inter-RAT network handover indication, and the target network access type, that this operation is the inter-RAT network handover.

In another possible design, the session connection establishment request carries a session identifier and/or first data channel information, where the first data channel information is used to establish the data transmission channel between the core network user plane function entity and the target radio access network node.

In another possible design, after the target session management function entity sends the session connection establishment request to the target mobility management function entity, the target mobility management function entity forwards the session connection establishment request to the target radio access network node, and the target session management function entity receives a session management message sent by the target mobility management function entity. The session management message is sent by the target mobility management function entity after the target mobility management function entity receives a handover complete notification sent by the target radio access network node. The handover complete notification includes the session management message, the session management message carries a session identifier and/or second data channel information, and where the second data channel information is used to establish the data transmission channel between the core network user plane function entity and the target radio access network node.

In another possible design, after the target session management function entity sends the session connection establishment request to the target mobility management function entity, the target mobility management function entity forwards the session connection establishment request to the target radio access network node, and the target session management function entity receives a session connection establishment response forwarded by the target mobility management function entity. The session connection establishment response is sent by the target radio access network node to the target mobility management function entity, and the session connection establishment response carries a session identifier and/or second data channel information. Additionally, the second data channel information is used to establish the data transmission channel between the core network user plane function entity and the target radio access network node.

In another possible design, the session management context is a session management context of a source system. Additionally, after the target session management function entity receives the session management context of the source system that is sent by the target mobility management function entity, the target session management function entity maps a mobility management context of the source system into a mobility management context of a target system.

According to a fifth aspect, this application provides a source mobility management function entity. The source mobility management function entity is configured to implement the method and a function performed by the source mobility management function entity in the first aspect. The source mobility management function entity is implemented by hardware/software, and the hardware/software of the source mobility management function entity includes a unit corresponding to the foregoing function.

According to a sixth aspect, this application provides a source session management function entity. The source session management function entity is configured to implement the method and a function performed by the source session management function entity in the second aspect. The source session management function entity is implemented by hardware/software, and the hardware/software of the source session management function entity includes a unit corresponding to the foregoing function.

According to a seventh aspect, this application provides a target mobility management function entity. The target mobility management function entity is configured to implement the method and a function performed by the target mobility management function entity in the third aspect. The target mobility management function entity is implemented by hardware/software, and the hardware/software of the target mobility management function entity includes a unit corresponding to the foregoing function.

According to an eighth aspect, this application provides a target session management function entity. The target session management function entity is configured to implement the method and a function performed by the target session management function entity in the fourth aspect. The target session management function entity is implemented by hardware/software, and the hardware/software of the target session management function entity includes a unit corresponding to the foregoing function.

According to a ninth aspect, this application provides a network handover device, including a processor, a memory, and a communications bus. The communications bus is configured to implement connection communication between the processor and the memory. The processor executes a program stored in the memory to implement the steps in the network handover method provided in the first aspect.

According to a tenth aspect, this application provides a network handover device, including a processor, a memory, and a communications bus. The communications bus is configured to implement connection communication between the processor and the memory. The processor executes a program stored in the memory to implement the steps in the network handover method provided in the second aspect.

According to an eleventh aspect, this application provides a network handover device, including a processor, a memory, and a communications bus. The communications bus is configured to implement connection communication between the processor and the memory. The processor executes a program stored in the memory to implement the steps in the network handover method provided in the third aspect.

According to a twelfth aspect, this application provides a network handover device, including a processor, a memory, and a communications bus. The communications bus is configured to implement connection communication between the processor and the memory. The processor executes a program stored in the memory to implement the steps in the network handover method provided in the fourth aspect.

BRIEF DESCRIPTION OF DRAWINGS

To describe the technical solutions in the embodiments of this application more clearly, the following briefly describes the accompanying drawings required for describing the embodiments. The accompanying drawings in the following description show merely some embodiments of this application, and a person of ordinary skill in the art may still derive other drawings from these accompanying drawings without creative efforts.

DESCRIPTION OF EMBODIMENTS

Figure 1:
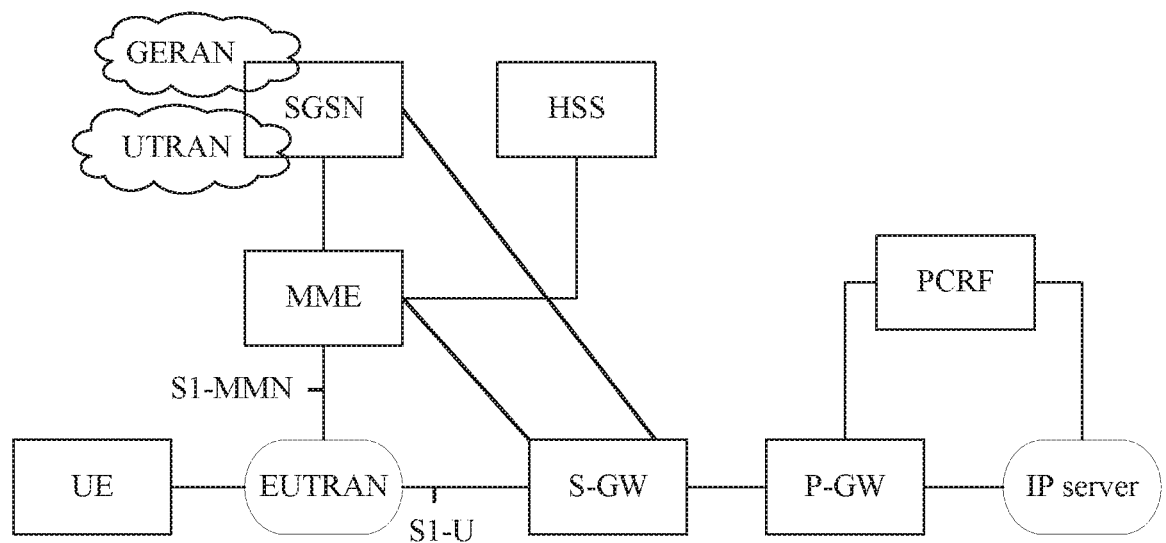
FIG. 1 is a schematic structural diagram of an EPS network architecture.
Figure 2:
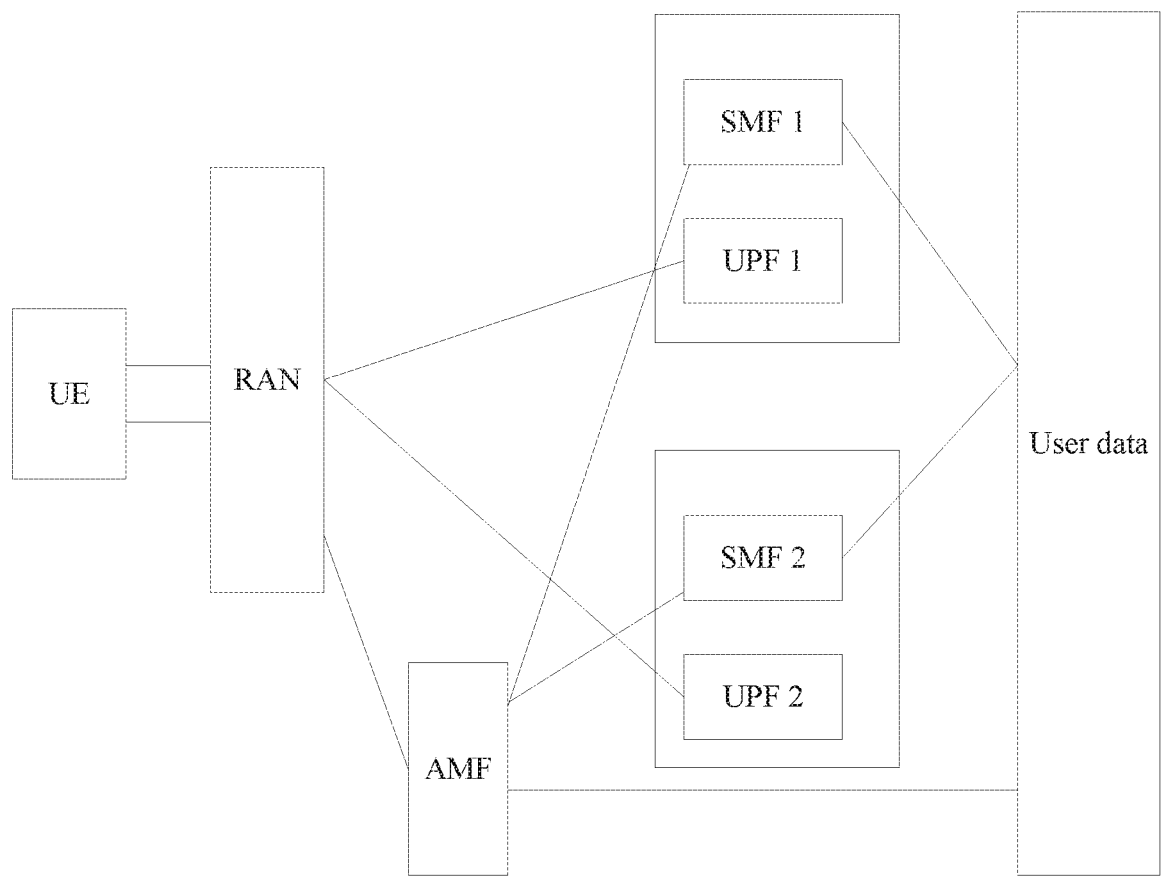
FIG. 2 is a schematic architectural diagram of a network slice.
Figure 3A:
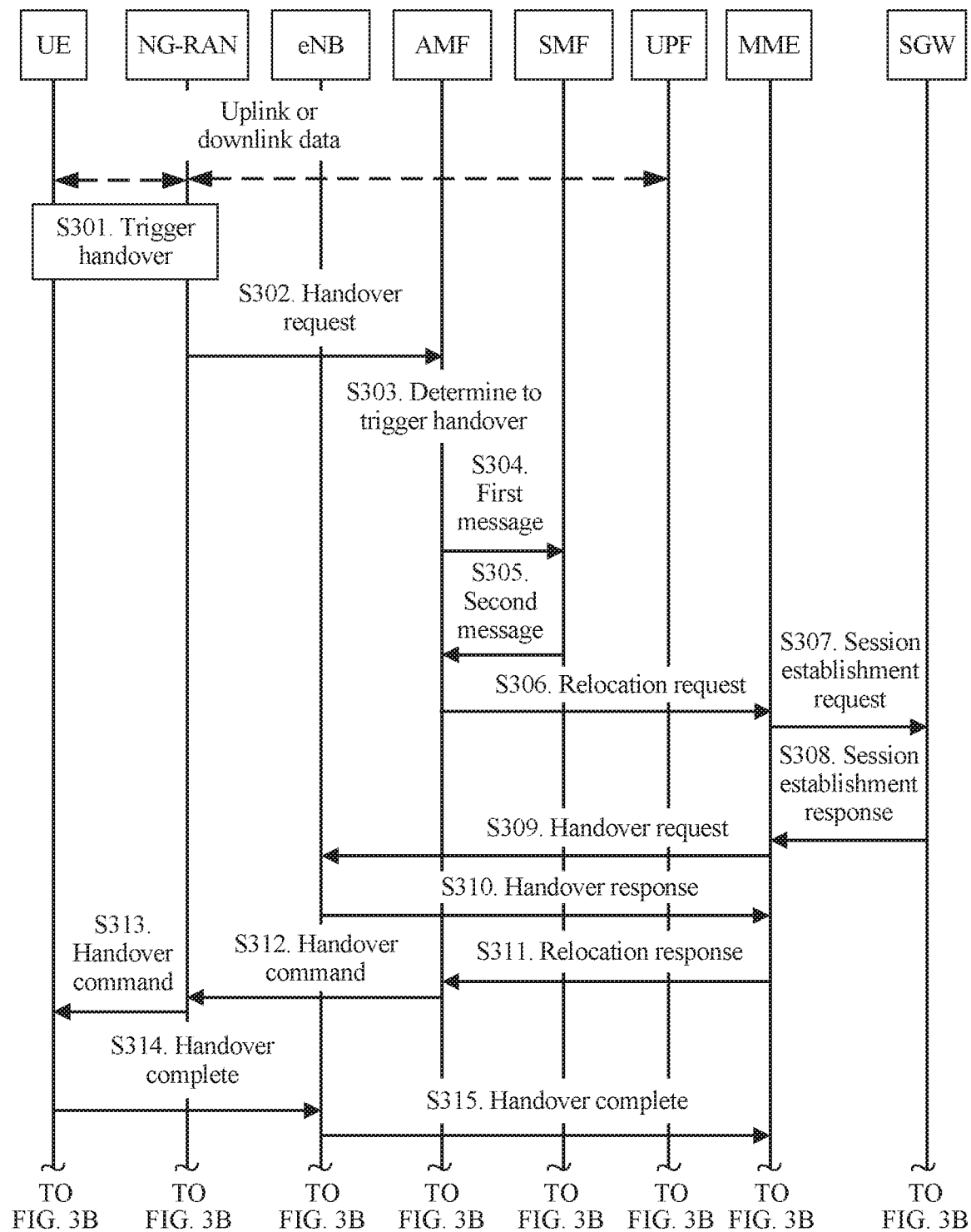
FIG. 3A and FIG. 3B are a schematic flowchart of a network handover method according to a first embodiment of this application.
Figure 3B:
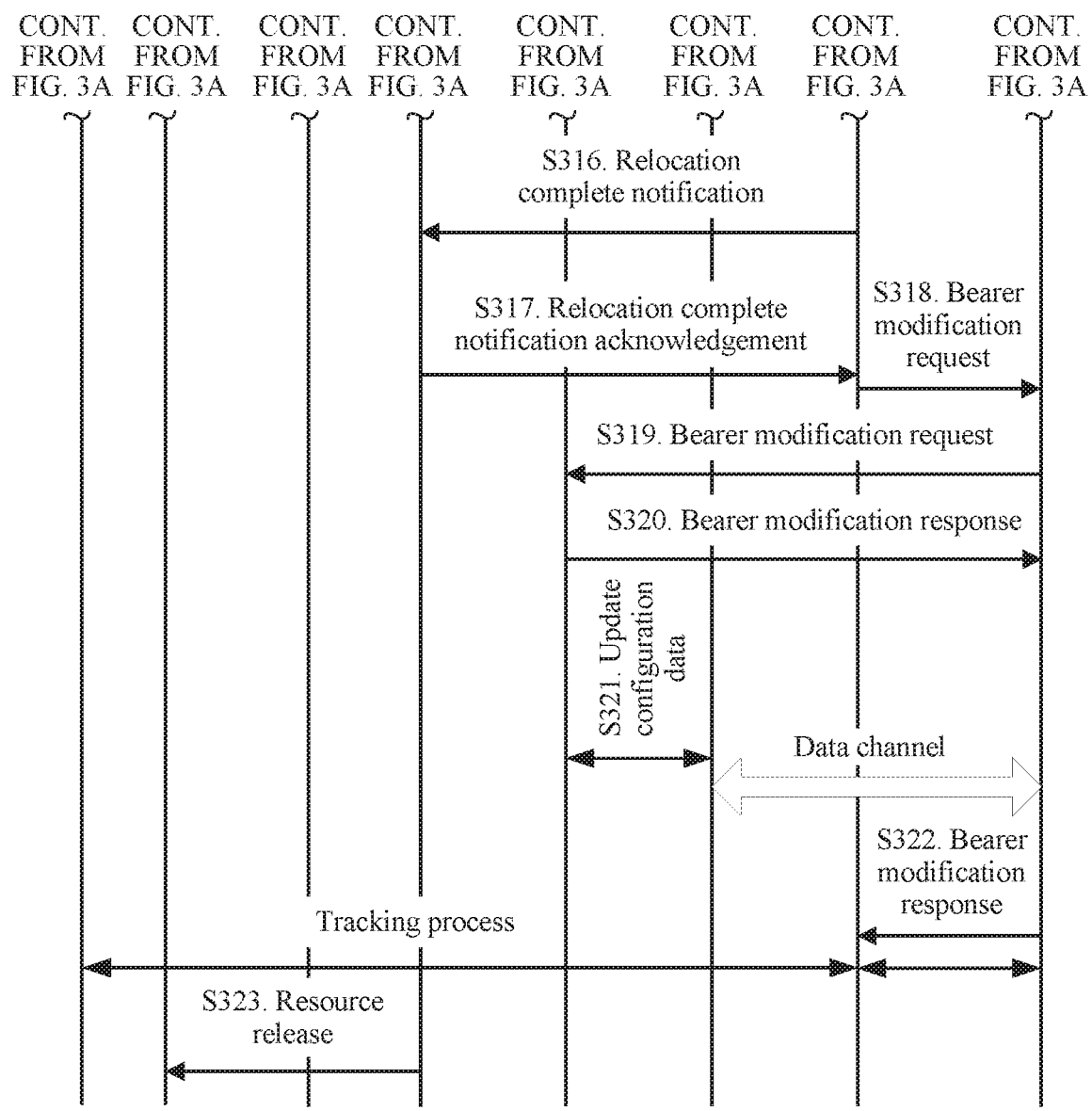

The following describes embodiments of this application with reference to the accompanying drawings. FIG. 3A and FIG. 3B are a schematic flowchart of a network handover method according to a first embodiment of this application. A process of performing handover from a 5G network (a source system) to a 4G network (a target system) is described in the figure. An NG-RAN, an AMF, and an SMF are devices in the 5G network, and an eNB and an MME are devices in the 4G network. As shown in the figure, the method in this embodiment of this application includes the following steps.

S301. A user terminal such as a UE triggers handover from a source radio access network node such as an NG-RAN to a target base station such as an eNB.

S302. The NG-RAN node sends, to a source mobility management function entity such as an AMF, a user terminal handover request that carries a target base station identifier.

S303. The source AMF determines, based on the target base station identifier, to trigger an inter-RAT network handover.

S304. The source AMF sends a first message to a source session management function (SMF) entity. Optionally, the first message includes the target base station identifier. Optionally, the target base station identifier is used by the source session management function entity to determine that this operation is the inter-RAT network handover.

Optionally, the first message further includes a target network access type and/or an inter-RAT network handover indication, and the target network access type and/or the inter-RAT network handover indication are/is used by the source SMF entity to determine that this operation is the inter-RAT network handover.

S305. The source SMF entity sends a second message to the source AMF, where the second message includes a session management context.

Optionally, before the source SMF sends the second message to the source AMF, the source SMF may determine, based on the target base station identifier, that this operation is inter-RAT handover; or may determine, based on the target network access type and/or the inter-RAT network handover indication, that this operation is the inter-RAT network handover.

Optionally, the second message includes the session management context of the user terminal, and the session management context is a session management context of the target system. Before the source SMF sends the second message to the source AMF, the source SMF obtains a session management context of the source system of the user terminal, and maps the session management context of the source system into the session management context of the target system.

S306. The source AMF sends a relocation request to a target mobility management function entity (MME), where the relocation request is used to instruct the target MME to perform inter-RAT network handover on the user terminal.

The relocation request carries the target base station identifier, a terminal identifier of the user terminal, the session management context, and a mobility management context.

Optionally, the relocation request further includes the mobility management context of the user terminal, and the mobility management context is a mobility management context of the target system. Before the source AMF sends the relocation request to the target MME, the source AMF obtains a mobility management context of the source system of the user terminal, and maps the mobility management context of the source system into the mobility management context of the target system.

S307. The target MME sends a session establishment request to a serving gateway (S-GW), where the session establishment request includes the session management context and a terminal identifier of the user terminal.

S308. The S-GW returns a session establishment response to the target MME.

S309. The target MME sends a handover request to the target eNB.

S310. The target eNB returns a handover request acknowledgement message to the target MME.

S311. The target MME sends a relocation response to the source AMF.

Based on resource preparation provided for the network handover in steps S301 to S311, the process of performing handover from the 5G network to the 4G network and performing network reconfiguration is described in steps S312 to S323. The steps S312 to S323 are performed as follows.

S312. The source AMF sends a handover command to the source NG-RAN.

S313. The source NG-RAN forwards the handover command to the UE.

S314. The UE sends a handover complete notification message to the target eNB.

S315. The target eNB sends a handover complete notification message to the target MME.

S316. The target MME sends a relocation complete notification to the source AMF.

S317. The source AMF sends a relocation complete notification acknowledgement to the target MME.

S318. The target MME sends a bearer modification request to the S-GW.

S319. The serving gateway S-GW sends a bearer modification request to the source session management function entity SMF.

S320. The source SMF returns a bearer modification response to the S-GW.

S321. The source SMF and a user plane function (UPF) entity update configuration data.

S322. The S-GW sends a bearer modification response to the target MME.

S323. The source AMF releases a network resource of the NG-RAN.

It should be noted that, a sequence of performing the steps in this embodiment of this application may not be limited, and the sequence of performing the steps may be changed.

Figure 4A:
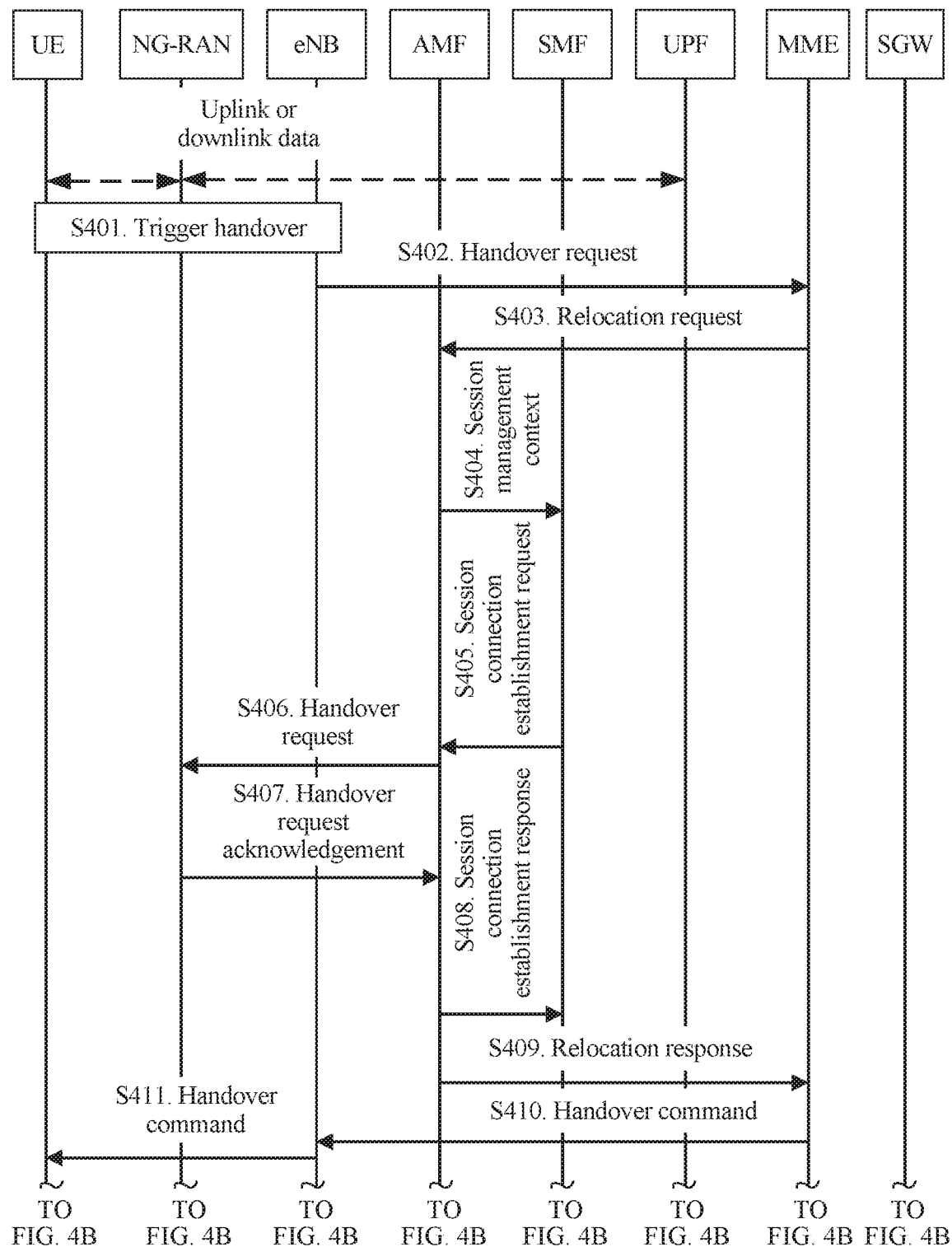
FIG. 4A and FIG. 4B are a schematic flowchart of a network handover method according to a second embodiment of this application.
Figure 4B:
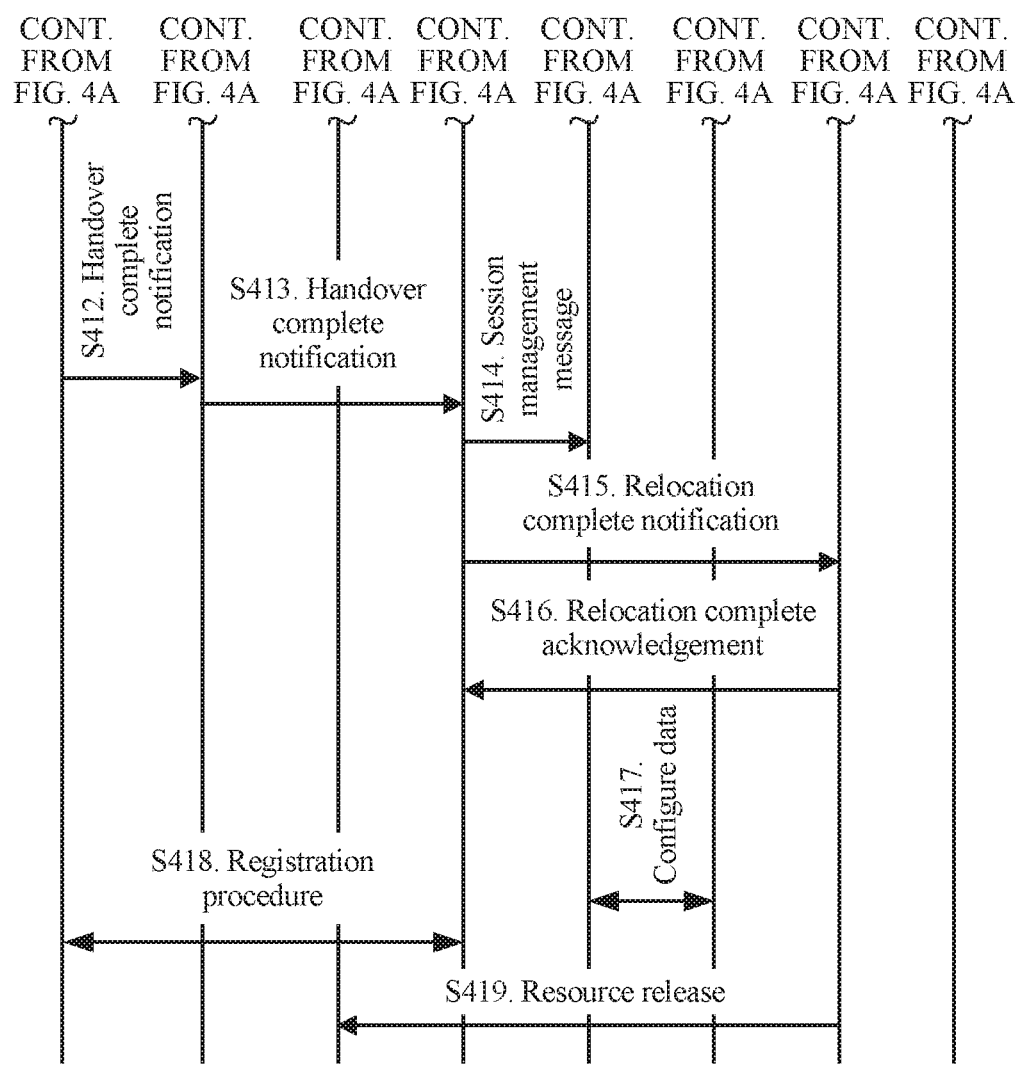

Referring to FIG. 4A and FIG. 4B, FIG. 4A and FIG. 4B are a schematic flowchart of a network handover method according to a second embodiment of this application. A process of performing handover from a 4G network (a source system) to a 5G network (a target system) is described in the figure. An NG-RAN, an AMF, and an SMF are devices in the 5G network, and an eNB and an MME are devices in the 4G network. As shown in the figure, the method in this embodiment of this application includes the following steps.

S401. A user terminal such as a UE triggers handover from a source base station such as an eNB to a target radio access network node such as an NG-RAN.

S402. The source eNB sends, to a source MME, a user terminal handover request that carries a network identifier of the target radio access network node.

S403. The source MME determines, based on the network identifier of the target radio access network node, to trigger inter-RAT network handover, and sends a relocation request to a target mobility management function entity such as an AMF.

The relocation request carries a terminal identifier of the user terminal, the network identifier of the target radio access network node, and context information of the user terminal, and the context information of the user terminal includes a mobility management context and a session management context.

S404. The target AMF sends a session management context to a target session management function entity such as an SMF.

Optionally, the relocation request includes the mobility management context of the user terminal, and the mobility management context is a mobility management context of the source system. Before sending the session management context to the target SMF, the target AMF may map the mobility management context of the source system into a mobility management context of the target system.

Optionally, the target AMF may further send the terminal identifier of the user terminal and the network identifier of the target radio access network node to the target SMF.

Optionally, the target AMF may further send an inter-RAT network handover indication and/or a target network access type to the target SMF, and the inter-RAT network handover indication and/or the target network access type are/is used by the target SMF to determine that this operation is the inter-RAT network handover.

S405. The target SMF sends a session connection establishment request to the target AMF.

Optionally, after receiving a session management context of the source system that is sent by the target AMF, the target SMF may map the session management context of the source system into a session management context of the target system, and then send the session connection establishment request to the target AMF.

The session connection establishment request carries a session identifier and/or first data channel information, and the first data channel information is used to establish a data transmission channel between a core network user plane function entity and the target radio access network node.

Optionally, the target SMF further receives the network identifier of the target radio access network node from the target AMF. Optionally, after receiving the session management context sent by the target AMF, the target SMF may determine, based on the network identifier of the target radio access network node, that this operation is the inter-RAT network handover.

Optionally, the target SMF further receives the inter-RAT network handover indication and/or the target network access type from the target AMF. After receiving the session management context sent by the target AMF, the target SMF may determine, based on the inter-RAT network handover indication and/or the target network access type, that this operation is the inter-RAT network handover.

Optionally, the target SMF further receives at least one of the network identifier of the target radio access network node, the inter-RAT network handover indication, and the target network access type from the target AMF. After receiving the session management context sent by the target AMF, the target SMF may determine, based on the at least one of the network identifier of the target radio access network node, the inter-RAT network handover indication, and the target network access type, that this operation is the inter-RAT network handover.

S406. The target AMF sends, to the target radio access network node such as the NG-RAN, a handover request that carries the session connection establishment request. Alternatively, the target AMF sends a handover request to the target NG-RAN, and sends the session connection establishment request to the target NG-RAN, where the two requests are two different messages, and the handover request is used to instruct the target radio access network node to perform inter-RAT network handover on the user terminal.

S407. The target NG-RAN sends a handover request acknowledgement to the target AMF. Alternatively, the target NG-RAN sends, to the target AMF, a handover request acknowledgement that carries a session connection establishment response.

Optionally, if the session connection establishment request is not included in the handover request sent to the target NG-RAN, and the session connection establishment response is not included in the handover request acknowledgement sent to the target NG-RAN, after receiving the handover request acknowledgement sent by the target NG- RAN, the target AMF may send the session connection establishment request to the target NG-RAN. Additionally, after receiving the session connection establishment request, the target NG-RAN returns the session connection establishment response to the target AMF.

The session connection establishment response carries the session identifier and/or second data channel information, and the second data channel information is used to establish the data transmission channel between the core network user plane function entity and the target radio access network node.

S408. The target AMF sends the session connection establishment response to the target SMF.

S409. The target AMF sends a relocation response to the source MME.

S410. The source MME sends a handover command to the source eNB.

S411. The source eNB sends the handover command to the UE.

S412. The UE sends a handover complete notification to the target NG-RAN.

S413. The target NG-RAN sends a handover complete notification to the target AMF, where the handover complete notification includes a session management message. The session management message carries a session identifier and/or second data channel information, and the second data channel information is used to establish a data transmission channel between a core network user plane function entity and the target radio access network node.

S414. The target AMF sends the session management message to the target SMF.

S415. The target AMF sends a relocation complete notification to the source MME.

S416. The source MME sends a relocation complete acknowledgement to the target AMF.

S417. A user plane function entity such as a UPF and the target SMF configure data.

S418. The user terminal UE and the target mobility management function entity AMF perform a registration procedure.

S419. The source MME releases a network resource of the source eNB.

It should be noted that, a sequence of performing the steps in this embodiment of this application may not be limited, and the sequence of performing the steps may be changed.

Figure 5A:
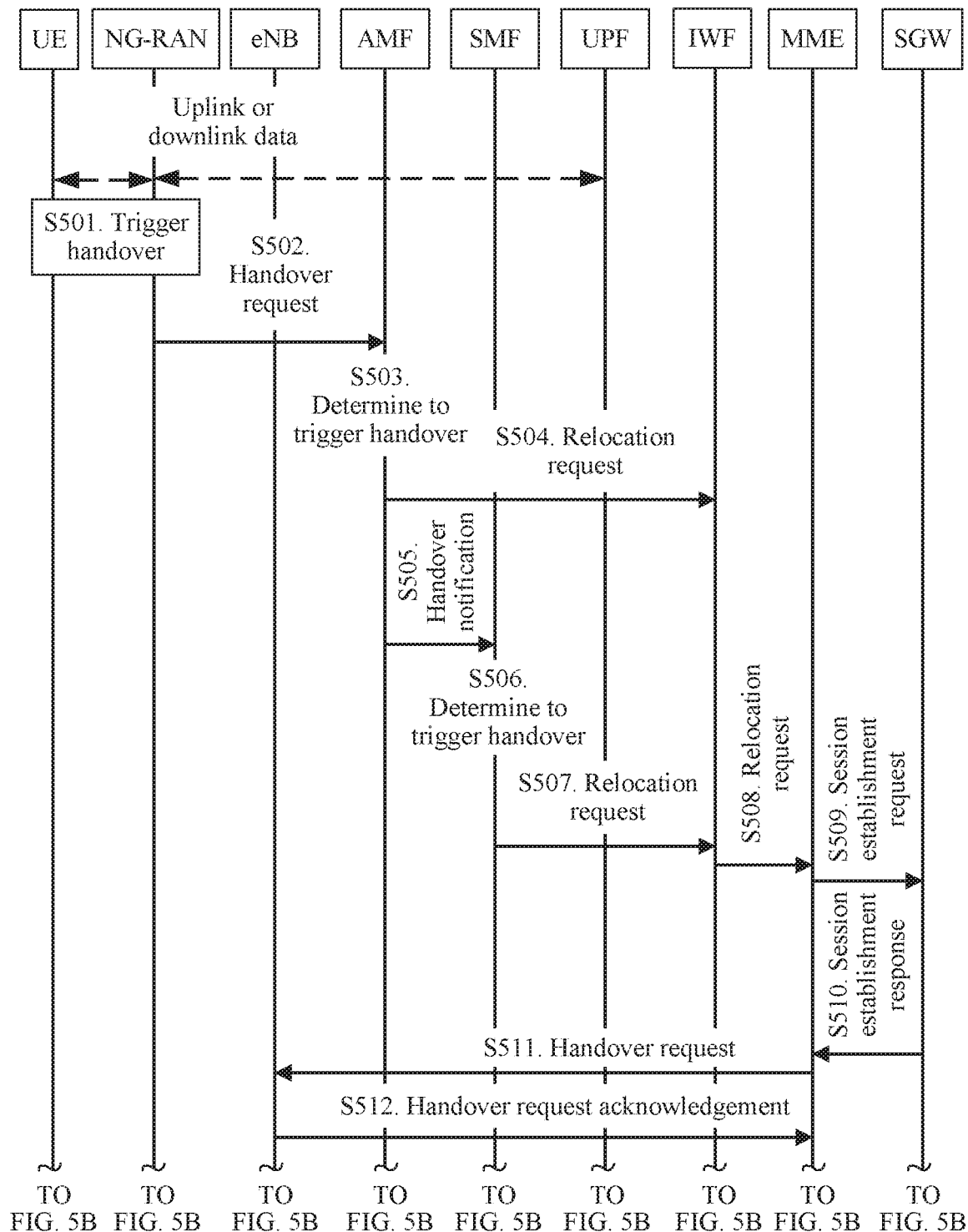
FIG. 5A, FIG. 5B, and FIG. 5C are a schematic flowchart of a network handover method according to a third embodiment of this application.
Figure 5B:
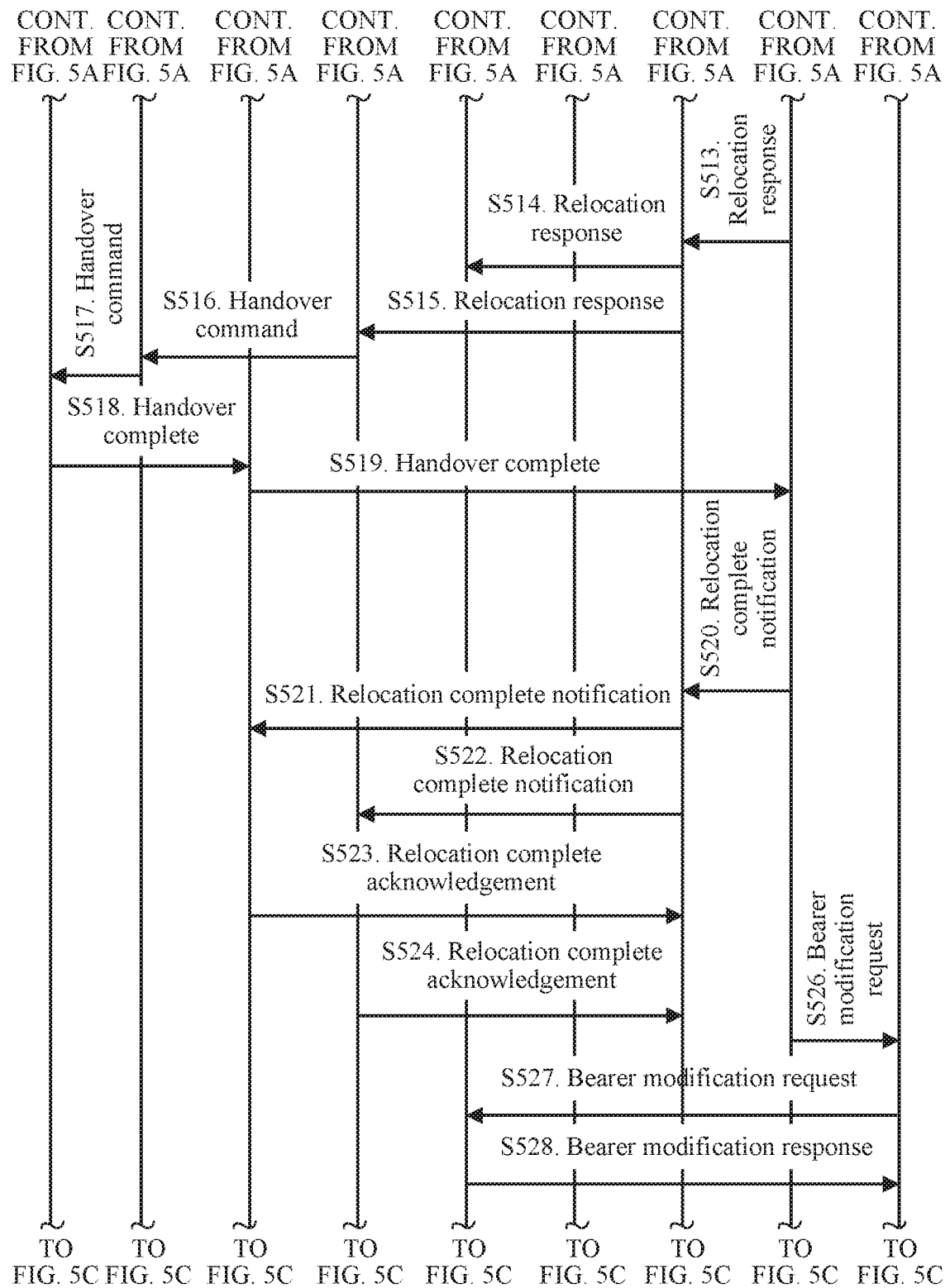
Figure 5C:
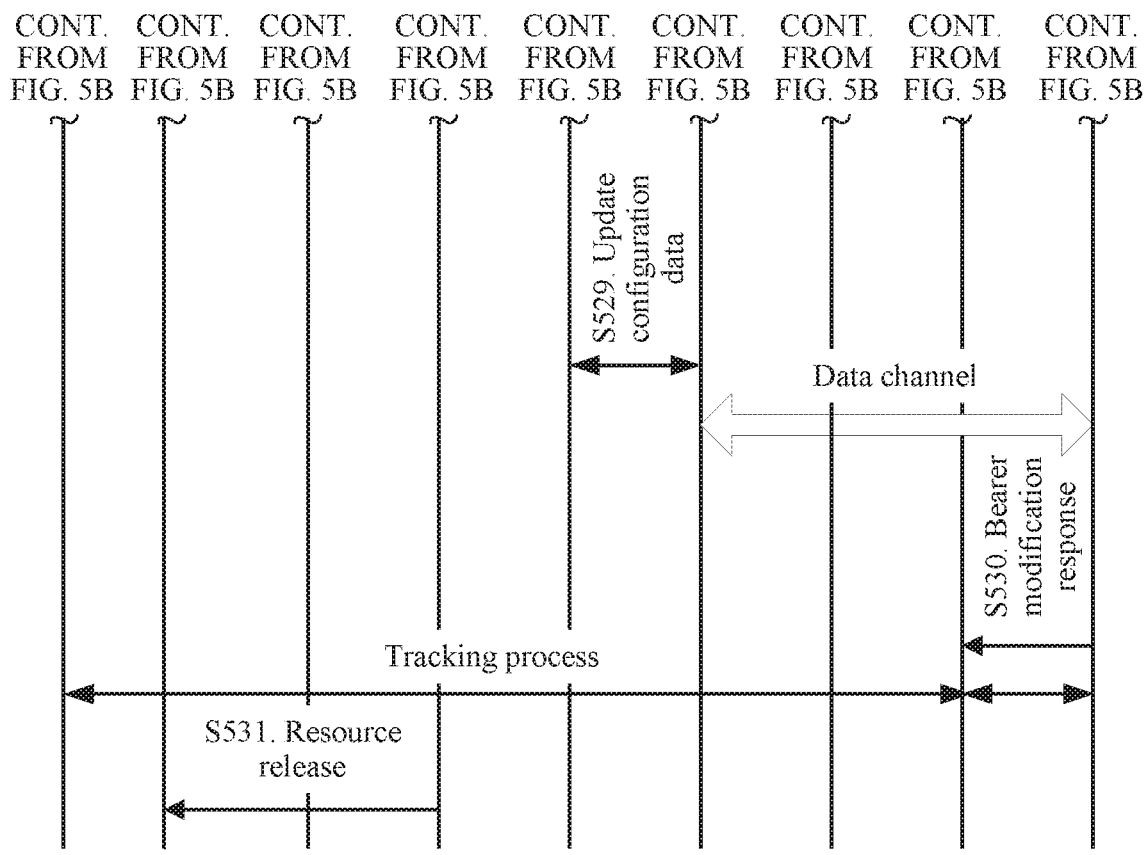

Referring to FIG. 5A, FIG. 5B, and FIG. 5C, FIG. 5A, FIG. 5B, and FIG. 5C are a schematic flowchart of a network handover method according to a third embodiment of this application. A process of performing handover from a 5G network (a source system) to a 4G network (a target system) is described in the figure. An NG-RAN, an AMF, and an SMF are devices in the 5G network, and an eNB and an MME are devices in the 4G network. In comparison with those in the first two embodiments, a system in this embodiment further includes an inter-working function (IWF) network element such as an IWF. The IWF is used as an interworking function node for implementing interworking of 5G and 4G, and is responsible for signaling compatibility processing, signaling receiving and sending, and context mapping. As shown in the figure, the method in this embodiment of this application includes the following steps.

S501. A user terminal such as a UE triggers handover from a source radio access network node such as an NG-RAN to a target base station such as an eNB.

S502. The source NG-RAN sends, to a source mobility management function entity such as an AMF, a user terminal handover request that carries a target base station identifier.

S503. The source AMF determines, based on the target base station identifier, to trigger inter-RAT network handover.

S504. The source AMF sends a relocation request to the IWF, where the relocation request carries a terminal identifier of the user terminal, the target base station identifier, and a mobility management context.

S505. The source AMF sends a handover notification to a source session management function entity such as an SMF, where the handover notification carries the terminal identifier of the UE and the target base station identifier.

Optionally, the handover notification includes a target network access type and/or an inter-RAT network handover indication, and the target network access type and/or the inter-RAT network handover indication are/is used by the source session management function entity to determine that this operation is the inter-RAT network handover.

S506. Optionally, the SMF determines, based on the target base station identifier, that this operation is the inter-RAT network handover; or determines, based on a target network access type and/or an inter-RAT network handover indication, that this operation is the inter-RAT network handover.

S507. The source SMF sends a relocation request to the IWF, where the relocation request includes a session management context and the terminal identifier of the UE.

S508. The IWF sends a relocation request to a target MME, where the relocation request includes the terminal identifier of the UE, the target base station identifier, the session management context, and the mobility management context.

Optionally, before sending the relocation request to the target MME, the IWF may map a mobility management context of the source system into a mobility management context of the target system, and map a session management context of the source system into a session management context of the target system.

S509. The target MME sends a session establishment request to a serving gateway (S-GW), where the session establishment request includes the session management context and the terminal identifier of the UE.

S510. The serving gateway S-GW returns a session establishment response to the target mobility management function entity MME.

S511. The target mobility management function entity MME sends a handover request to the target eNB.

S512. The target eNB sends a handover request acknowledgement to the target MME.

S513. The target MME sends a relocation response to the IWF.

S514. The IWF sends a relocation response to the source SMF.

S515. The IWF sends a relocation response to the source AMF.

Based on resource preparation provided for network handover in steps S501 to S515, the process of performing handover from the 5G network to the 4G network and performing network reconfiguration is described in steps S516 to S531. Steps S516 to S531 are similar to those in the first embodiment of this application, and details are not described in this embodiment of this application.

It should be noted that, a sequence of performing the steps in this embodiment of this application may not be limited, and the sequence of performing the steps may be changed.

Figure 6A:
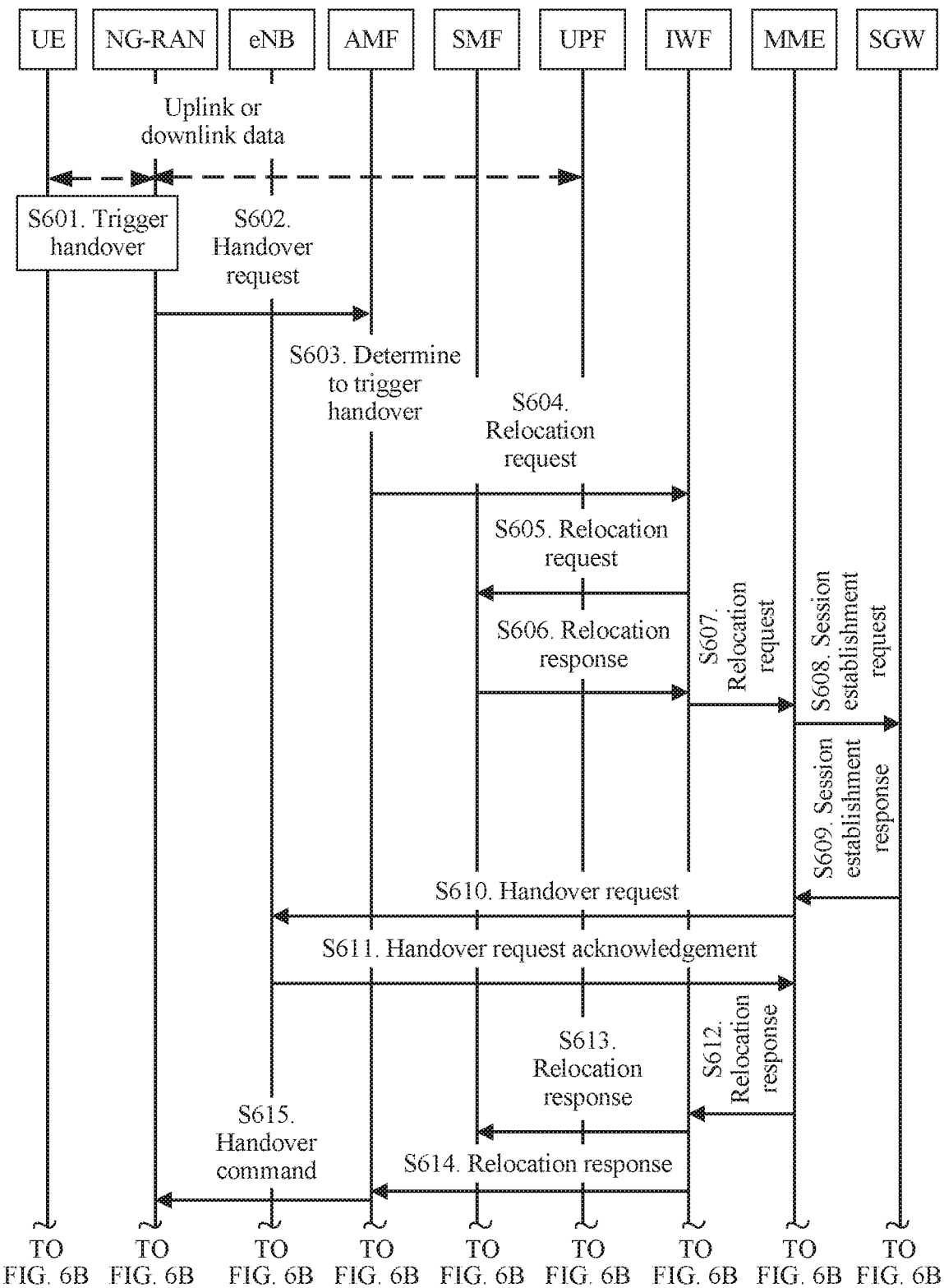
FIG. 6A, FIG. 6B, and FIG. 6C are a schematic flowchart of a network handover method according to a fourth embodiment of this application.
Figure 6B:
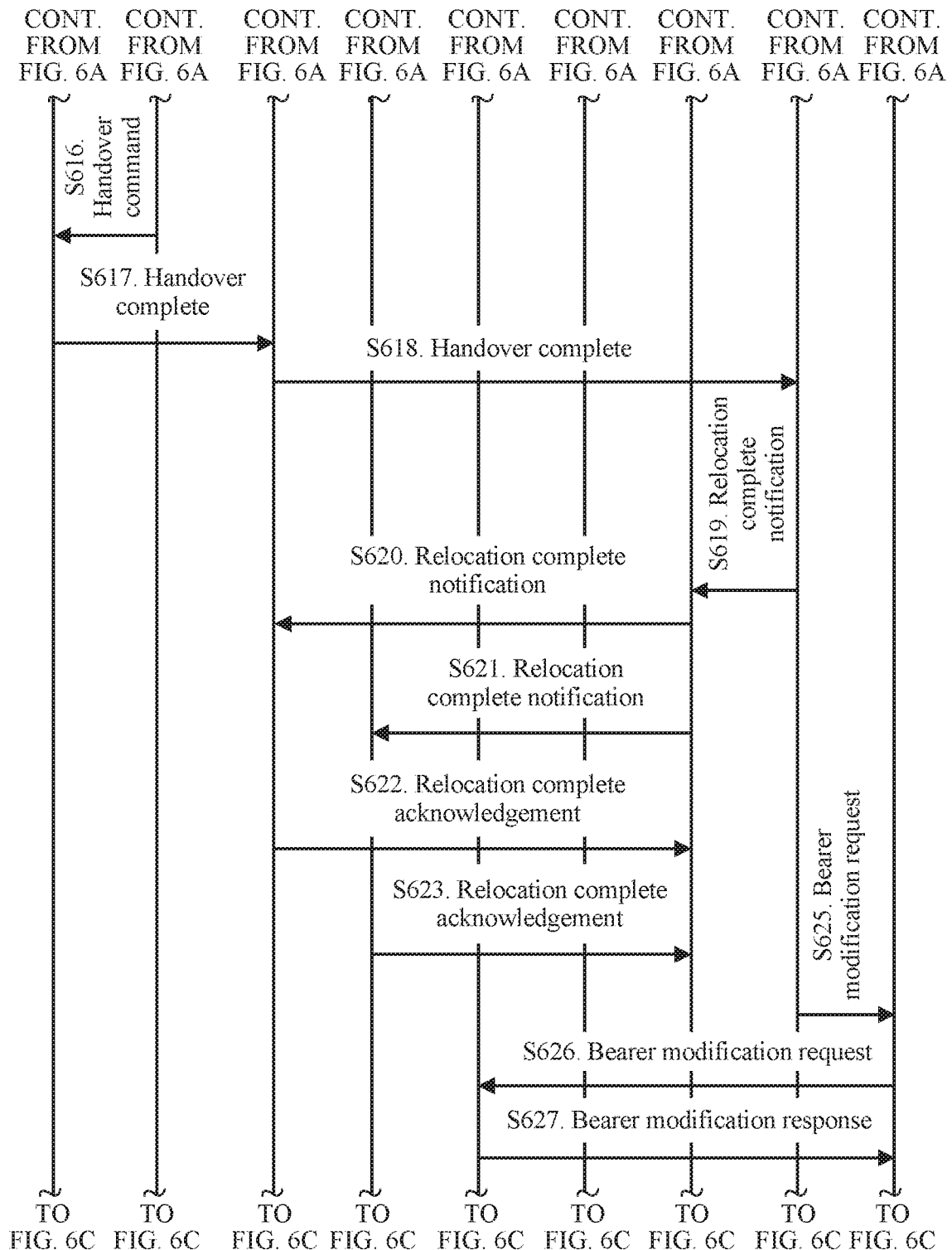
Figure 6C:
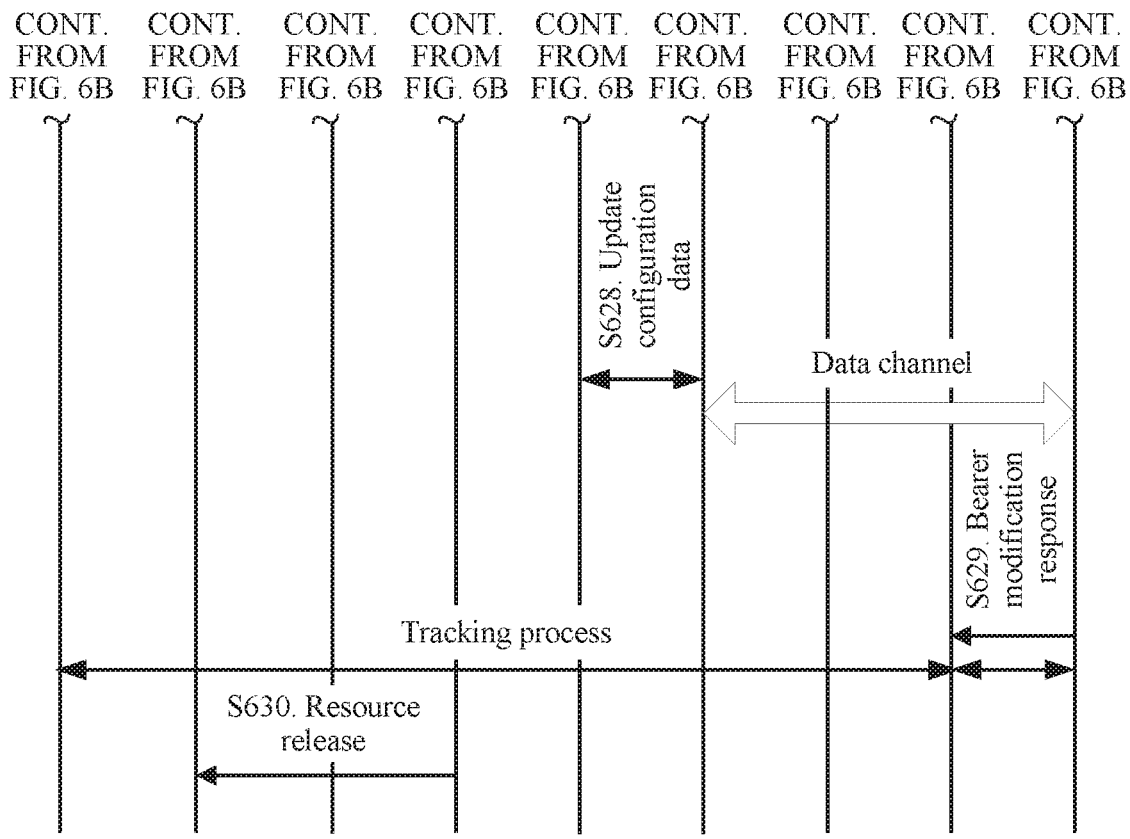

Referring to FIG. 6A, FIG. 6B, and FIG. 6C, FIG. 6A, FIG. 6B, and FIG. 6C are a schematic flowchart of a network handover method according to a fourth embodiment of this application. A process of performing handover from a 5G network (a source system) to a 4G network (a target system) is described in the figure. An NG-RAN, an AMF, and an SMF are devices in the 5G network, and an eNB and an MME are devices in the 4G network. In comparison with those in the first two embodiments, a system in this embodiment further includes an inter-working function network element such as an IWF. The IWF is used as an interworking function node for implementing interworking of 5G and 4G, and is responsible for signaling compatibility processing, signaling receiving and sending, and context mapping. As shown in the figure, the method in this embodiment of this application includes the following steps.

S601. A user terminal such as a UE triggers handover from a source radio access network node such as an NG-RAN to a target base station such as an eNB.

S602. The source NG-RAN sends, to a source mobility management function entity such as an AMF, a user terminal handover request that carries a target base station identifier.

S603. The source AMF determines, based on the target base station identifier, to trigger an inter-RAT network handover.

S604. The source AMF sends a relocation request to the IWF, where the relocation request carries a terminal identifier of the user terminal, the target base station identifier, and a mobility management context.

S605. The IWF sends a relocation request to a source session management function entity such as an SMF, where the relocation request includes the terminal identifier of the user terminal.

S606. The source SMF sends a relocation response to the IWF, where the relocation response includes a session management context.

S607. The IWF sends a relocation request to a target MME, where the relocation request includes the terminal identifier of the user terminal, the target base station identifier, the session management context, and the mobility management context.

Optionally, before sending the relocation request to the target MME, the IWF may map a mobility management context of the source system into a mobility management context of the target system, and map a session management context of the source system into a session management context of the target system.

S608. The target MME sends a session establishment request to a serving gateway (S-GW), where the session establishment request includes the session management context and the terminal identifier of the user terminal.

S609. The S-GW returns a session establishment response to the target MME.

S610. The target MME sends a handover request to the target eNB.

S611. The target eNB sends a handover request acknowledgement to the target MME.

S612. The target MME sends a relocation response to the IWF.

S613. The IWF sends a relocation response to the source SMF.

S614. The IWF sends a relocation response to the source AMF.

Based on resource preparation provided for network handover in steps S601 to S614, the process of performing handover from the 5G network to the 4G network and performing network reconfiguration is described in steps S615 to S630. Steps S615 to S630 are similar to those in the first embodiment of this application, and details are not described in this embodiment of this application.

It should be noted that, a sequence of performing the steps in this embodiment of this application may not be limited, and the sequence of performing the steps may be changed.

Figure 7A:
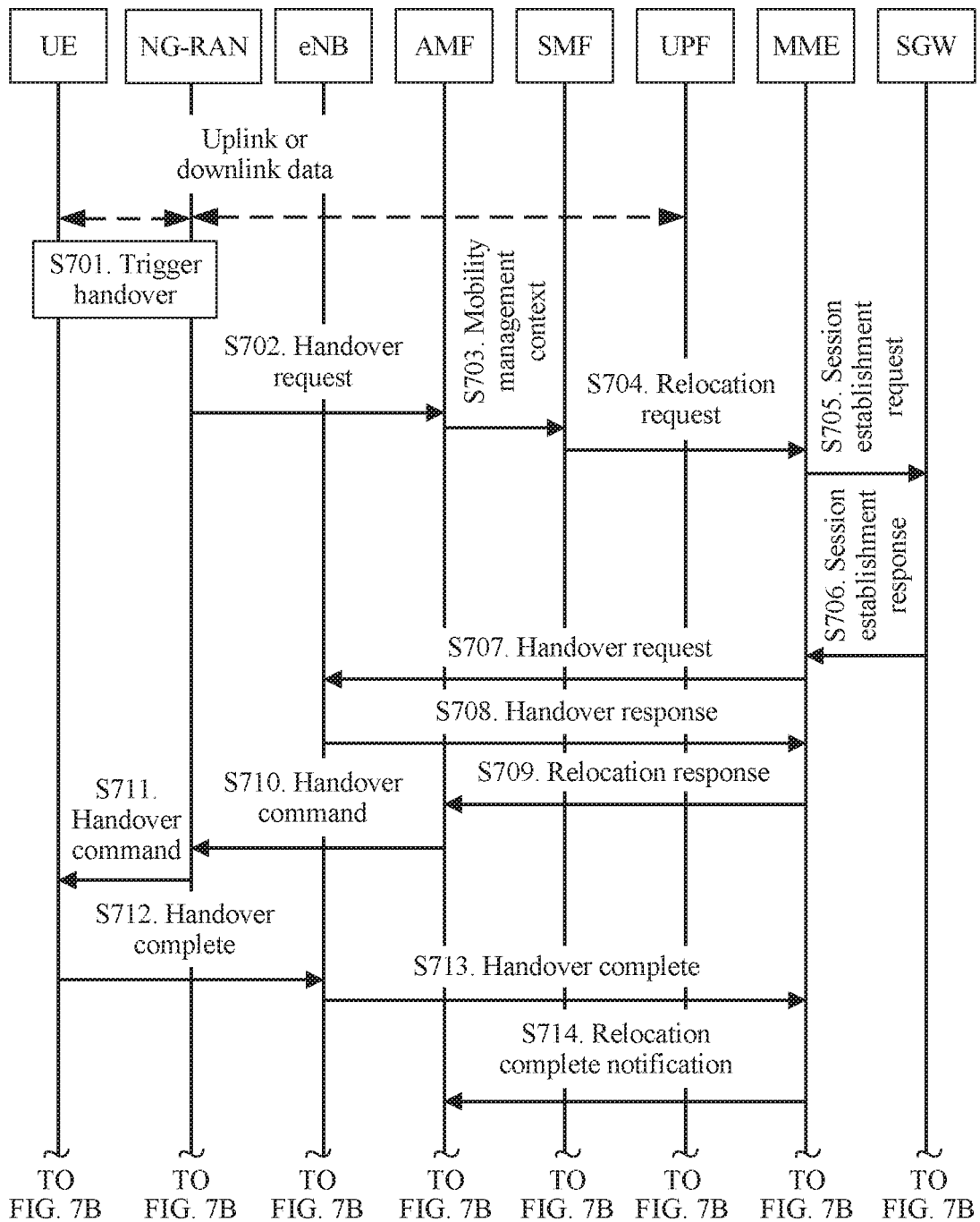
FIG. 7A and FIG. 7B are a schematic flowchart of a network handover method according to a fifth embodiment of this application.
Figure 7B:
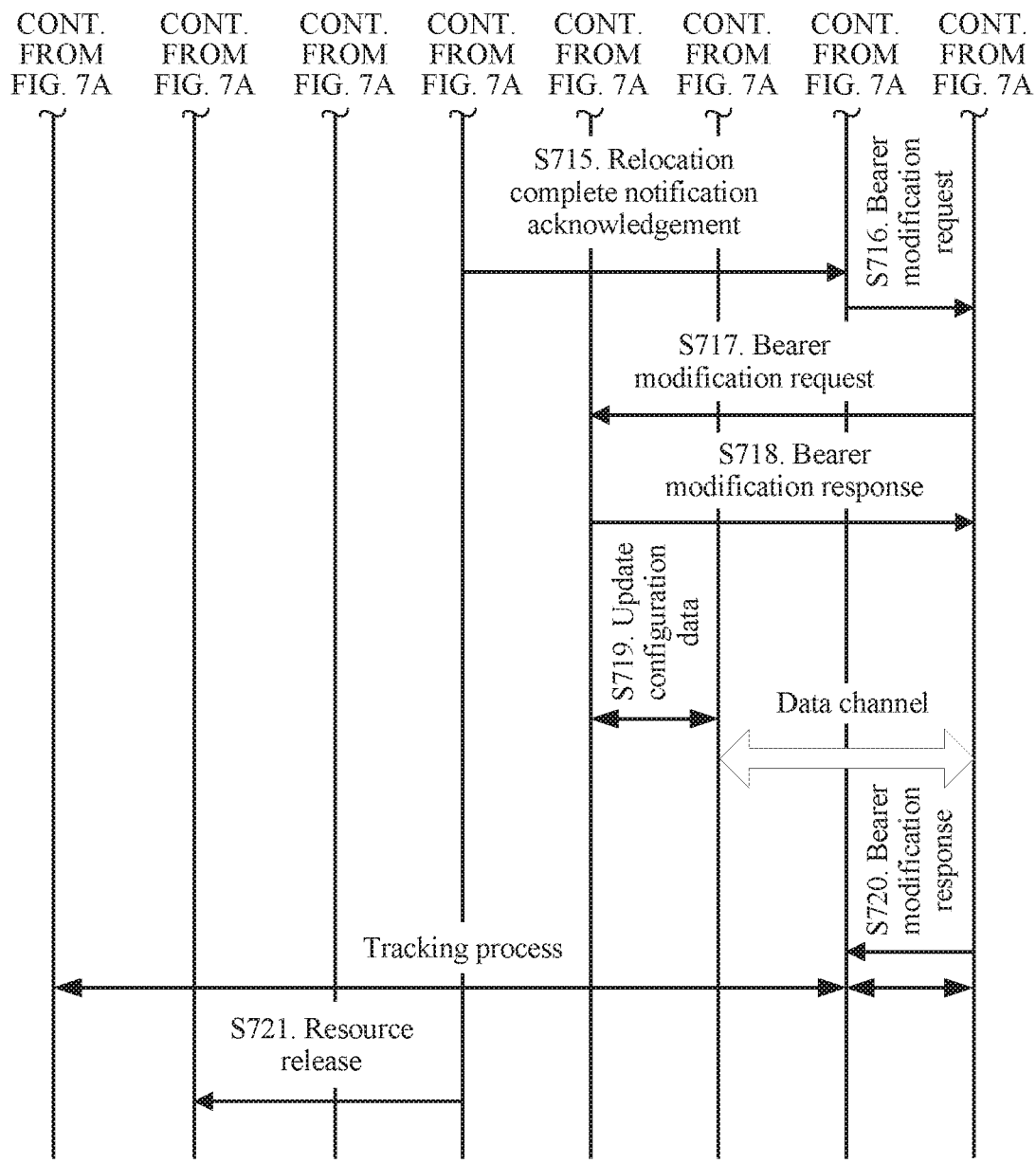

Referring to FIG. 7A and FIG. 7B, FIG. 7A and FIG. 7B are a schematic flowchart of a network handover method according to a fifth embodiment of this application. A process of performing handover from a 5G network (a source system) to a 4G network (a target system) is described in the figure. An NG-RAN, an AMF, and an SMF are devices in the 5G network, and an eNB and an MME are devices in the 4G network. As shown in the figure, the method in this embodiment of this application includes the following steps.

S701. A user terminal UE triggers a handover from a source radio access network node such as an NG-RAN to a target base station such as an eNB.

S702. The source NG-RAN sends, to a source mobility management function entity such as an AMF, a user terminal handover request that carries a target base station identifier.

S703. The source AMF determines, based on the target base station identifier, to trigger inter-RAT network handover, and sends a mobility management context to a source session management function entity such as an SMF.

The mobility management context carries the target base station identifier and a terminal identifier of the user terminal, and the target base station identifier is used by the source SMF to determine that this operation is the inter-RAT network handover.

Optionally, before the source AMF sends the mobility management context to the source SMF, the source AMF may obtain a mobility management context of the source system of the user terminal, and map the mobility management context of the source system into a mobility management context of the target system.

S704. The source SMF sends a relocation request to a target MME, where the relocation request is used to instruct the target mobility management function entity to perform inter-RAT network handover on the user terminal.

The relocation request carries the target base station identifier, the terminal identifier of the user terminal, a session management context, and the mobility management context.

Optionally, before the source SMF sends the relocation request to the target MME, the source SMF obtains a session management context of the source system of the user terminal, and maps the session management context of the source system into a session management context of the target system.

S705. The target MME sends a session establishment request to a serving gateway (S-GW), where the session establishment request includes a session management context and a terminal identifier of the user terminal.

S706. The serving gateway S-GW returns a session establishment response to the target MME.

S707. The target MME sends a handover request to the target eNB.

S708. The target eNB returns a handover request acknowledgement message to the target MME.

S709. The target MME sends a relocation response to the source AMF.

Based on resource preparation provided for network handover in steps S701 to S709, the process of performing handover from the 5G network to the 4G network and performing network reconfiguration is described in steps S710 to S721. Steps S710 to S721 are similar to those in the first embodiment of this application, and details are not described in this embodiment of this application.

It should be noted that, a sequence of performing the steps in this embodiment of this application may not be limited, and the sequence of performing the steps may be changed.

Figure 8A:
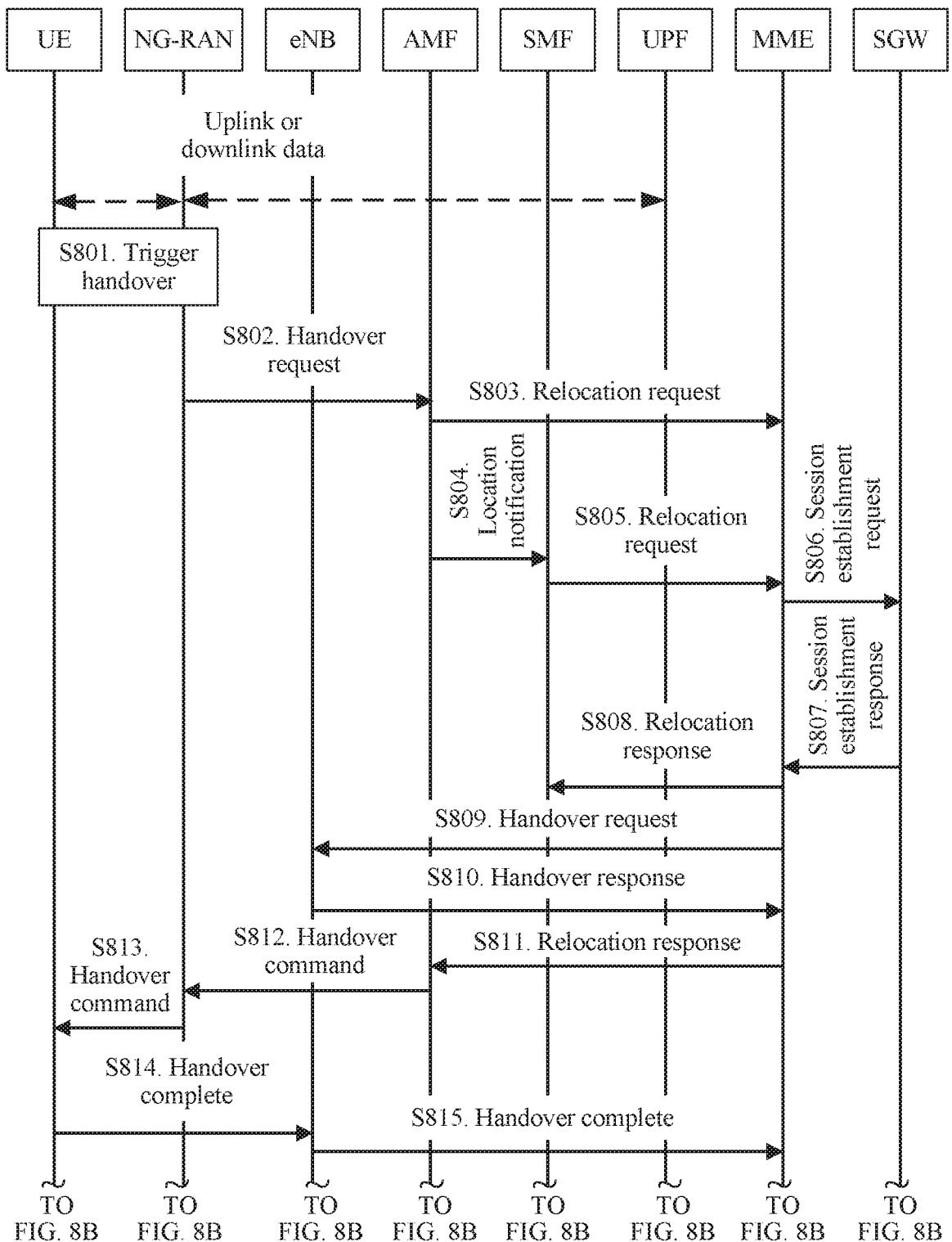
FIG. 8A and FIG. 8B are a schematic flowchart of a network handover method according to a sixth embodiment of this application.
Figure 8B:
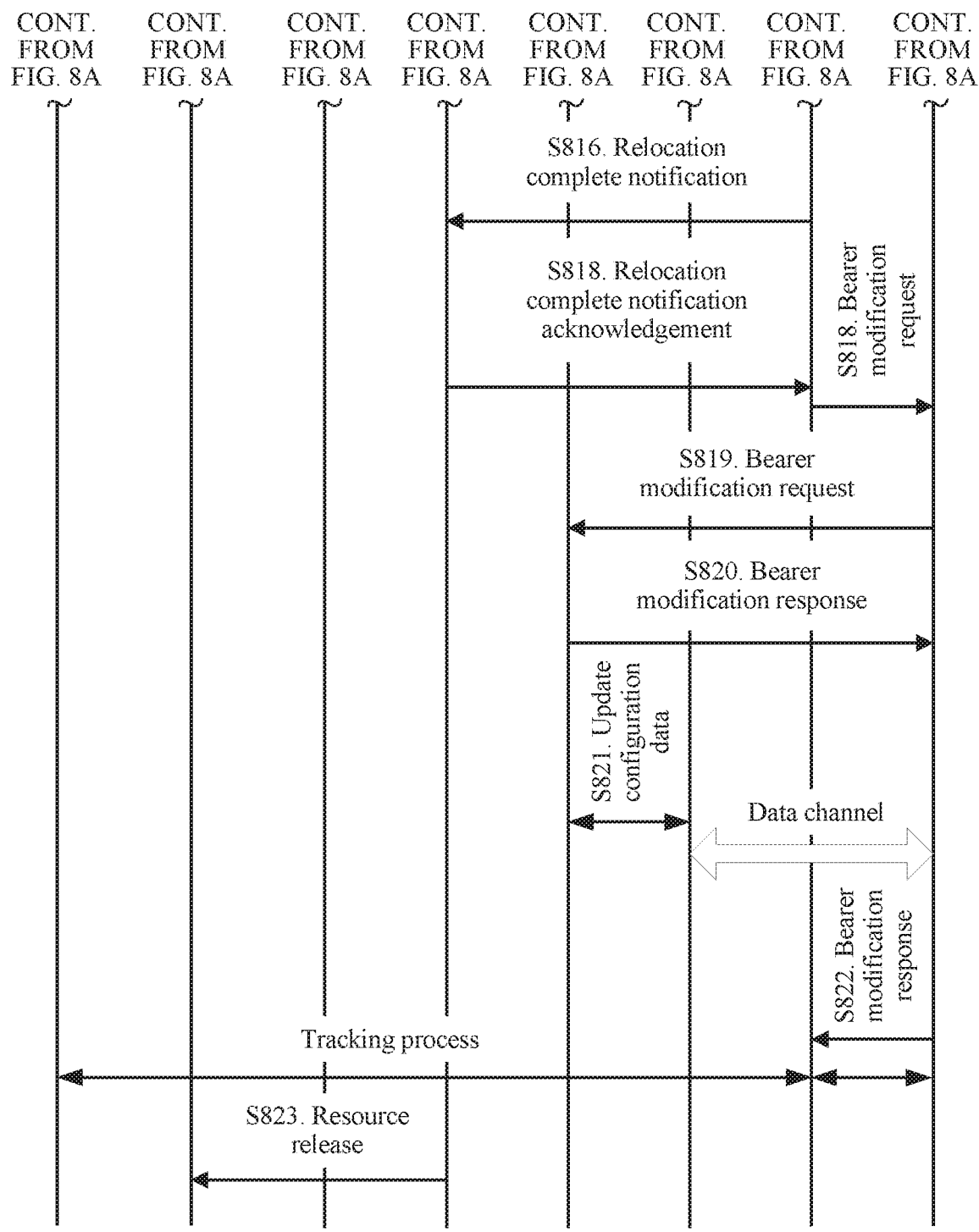

Referring to FIG. 8A and FIG. 8B, FIG. 8A and FIG. 8B are a schematic flowchart of a network handover method according to a sixth embodiment of this application. A process of performing handover from a 5G network (a source system) to a 4G network (a target system) is described in the figure. An NG-RAN, an AMF, and an SMF are devices in the 5G network, and an eNB and an MME are devices in the 4G network. As shown in the figure, the method in this embodiment of this application includes the following steps.

S801. A user terminal such as a UE triggers handover from a source radio access network node such as an NG-RAN to a target base station such as an eNB.

S802. The source NG-RAN sends, to a source mobility management function entity such as an AMF, a user terminal handover request that carries a target base station identifier.

S803. The source AMF determines, based on the target base station identifier, to trigger inter-RAT network handover, and sends a relocation request to a target MME, where the relocation request includes a terminal identifier of the user terminal, the target base station identifier, and a mobility management context.

Optionally, before the source AMF sends the relocation request to the target MME, the source AMF may obtain a mobility management context of the source system of the user terminal, and map the mobility management context of the source system into a mobility management context of the target system.

S804. The source AMF sends a location notification to a source session management function entity such as an SMF, where the location notification includes the terminal identifier of the user terminal and a network address of the target MME.

S805. The source SMF sends a relocation request to the target MME based on the network address of the target MME, where the relocation request includes a session management context and the terminal identifier of the user terminal.

Optionally, before sending the relocation request to the target MME, the source SMF may obtain a session management context of the source system of the user terminal, and map the session management context of the source system into a session management context of the target system.

S806. The target MME sends a session establishment request to a serving gateway (S-GW), where the session establishment request includes the session management context and the terminal identifier of the user terminal.

S807. The S-GW returns a session establishment response to the target MME.

S808. The target MME sends a relocation response to the source SMF.

S809. The target MME sends a handover request to the target eNB.

S810. The target eNB returns a handover request acknowledgement message to the target MME.

S811. The target MME sends a relocation response to the source AMF.

Based on resource preparation provided for network handover in steps S801 to S811, the process of performing handover from the 5G network to the 4G network and performing network reconfiguration is described in steps S812 to S823. Steps S812 to S823 are similar to those in the first embodiment of this application, and details are not described in this embodiment of this application.

It should be noted that, a sequence of performing the steps in this embodiment of this application may not be limited, and the sequence of performing the steps may be changed.

Figure 9A:
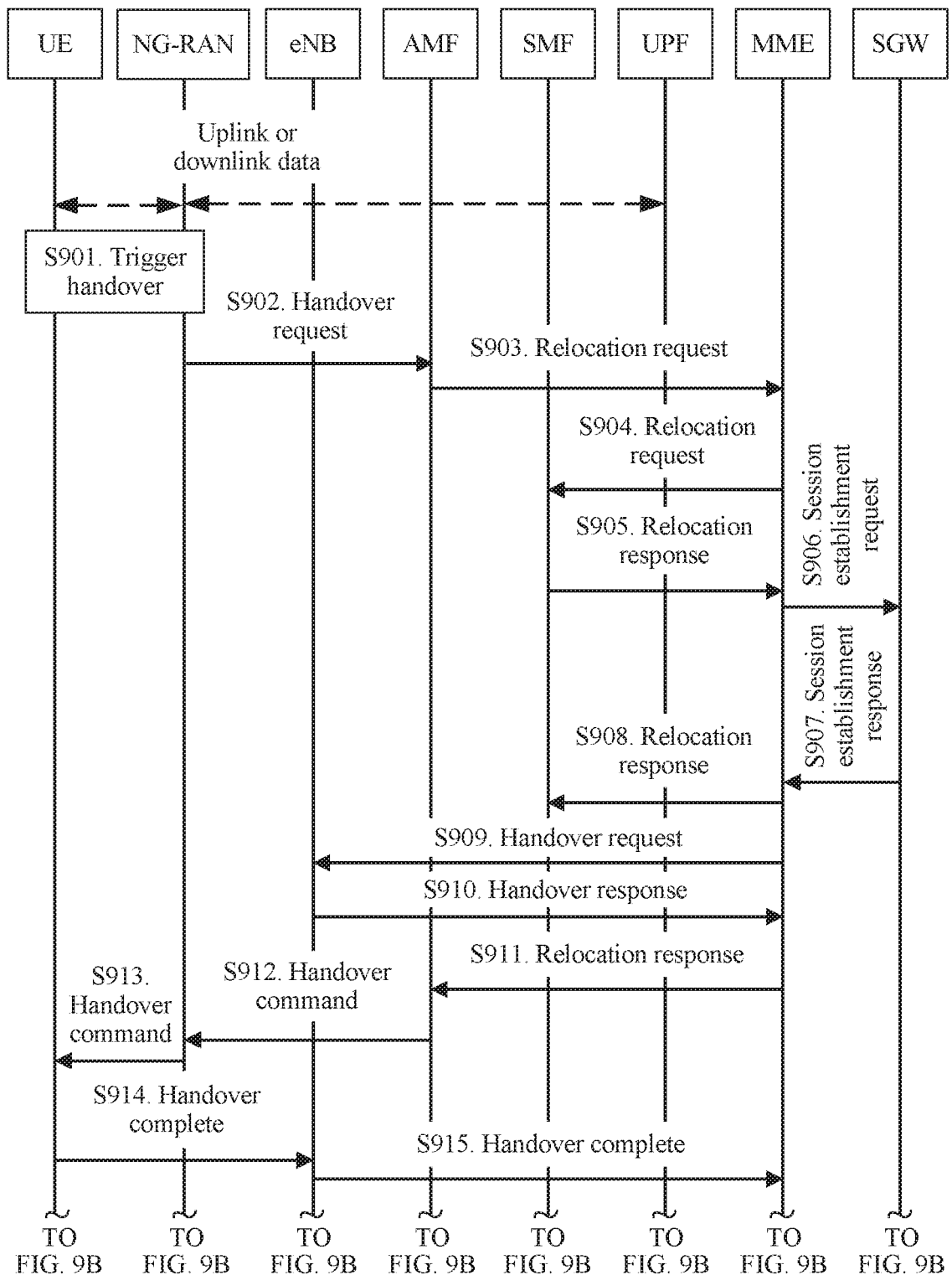
FIG. 9A and FIG. 9B are a schematic flowchart of a network handover method according to a seventh embodiment of this application.
Figure 9B:
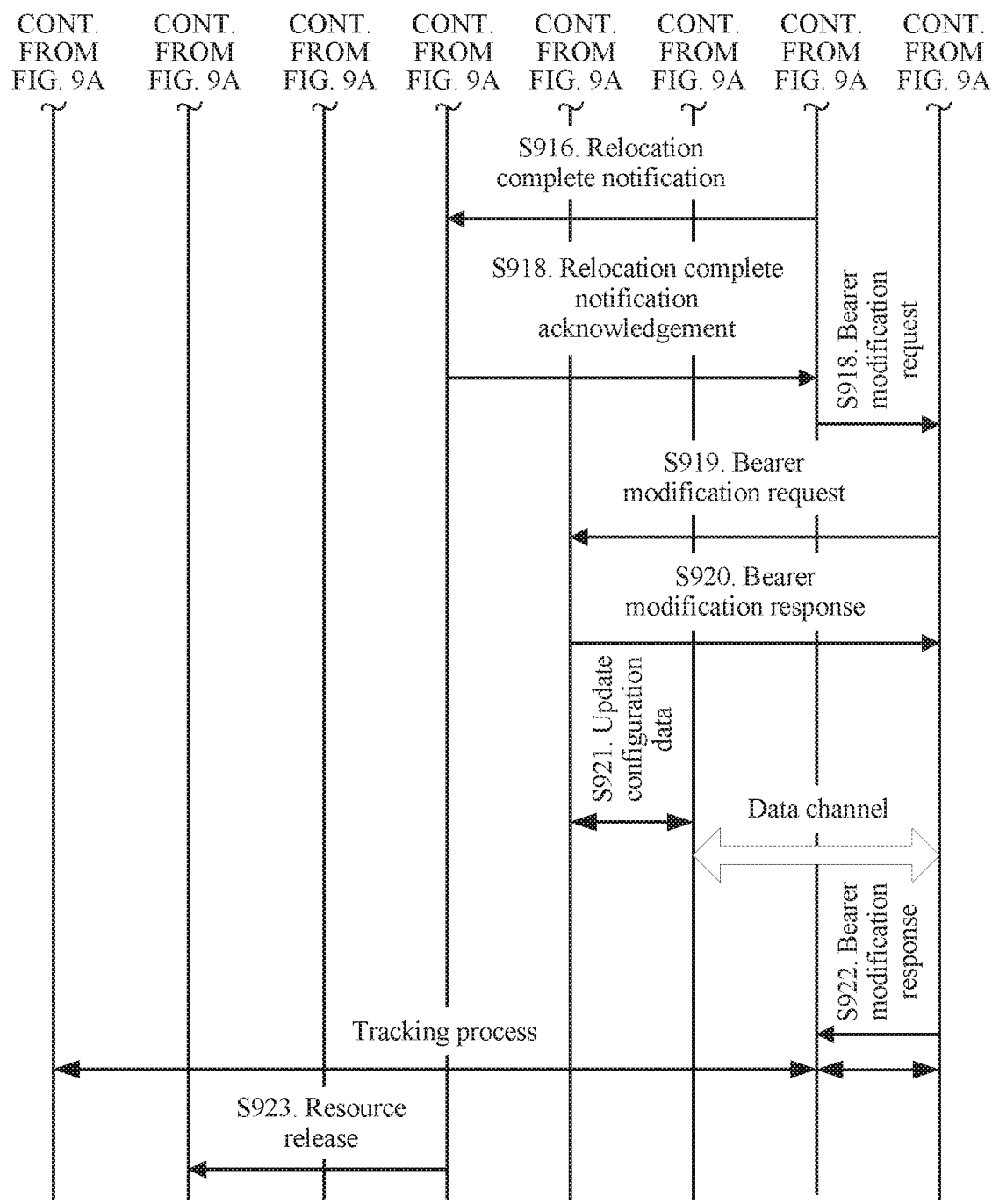

Referring to FIG. 9A and FIG. 9B, FIG. 9A and FIG. 9B are a schematic flowchart of a network handover method according to a seventh embodiment of this application. A process of performing handover from a 5G network (a source system) to a 4G network (a target system) is described in the figure. An NG-RAN, an AMF, and an SMF are devices in the 5G network, and an eNB and an MME are devices in the 4G network. As shown in the figure, the method in this embodiment of this application includes the following steps.

S901. A user terminal such as a UE triggers handover from a source radio access network node such as an NG-RAN to a target base station such as an eNB.

S902. The source NG-RAN sends, to a source mobility management function entity such as an AMF, a user terminal handover request that carries a target base station identifier.

S903. The source AMF determines, based on the target base station identifier, to trigger inter-RAT network handover, and sends a relocation request to a target MME. The relocation request includes a terminal identifier of the user terminal, the target base station identifier, a mobility management context, and a network address of a source session management function entity SMF.

Optionally, before the source AMF sends the relocation request to the target MME, the source AMF may obtain a mobility management context of the source system of the user terminal, and map the mobility management context of the source system into a mobility management context of the target system.

S904. The target MME sends a relocation request to a source session management function entity such as an SMF based on the network address of the source SMF, where the relocation request includes the terminal identifier of the user terminal.

S905. The source SMF sends a relocation response to the target MME, where the relocation response includes a session management context, quality of service information, and a data transmission channel.

Optionally, before the source SMF sends the relocation response to the target MME, the source SMF may obtain a session management context of the source system of the user terminal, and map the session management context of the source system into a session management context of the target system.

S906. The target MME sends a session establishment request to a serving gateway (S-GW), where the session establishment request includes the session management context and the terminal identifier of the user terminal.

S907. The S-GW returns a session establishment response to the target MME.

S908. The target MME sends a relocation response to the source SMF.

S909. The target MME sends a handover request to the target eNB.

S910. The target eNB returns a handover request acknowledgement message to the target MME.

S911. The target MME sends a relocation response to the source AMF.

Based on resource preparation provided for network handover in steps S901 to S911, the process of performing handover from the 5G network to the 4G network and performing network reconfiguration is described in steps S912 to S923. Steps S912 to S923 are similar to those in the first embodiment of this application, and details are not described in this embodiment of this application.

It should be noted that, a sequence of performing the steps in this embodiment of this application may not be limited, and the sequence of performing the steps may be changed.

Figure 10A:
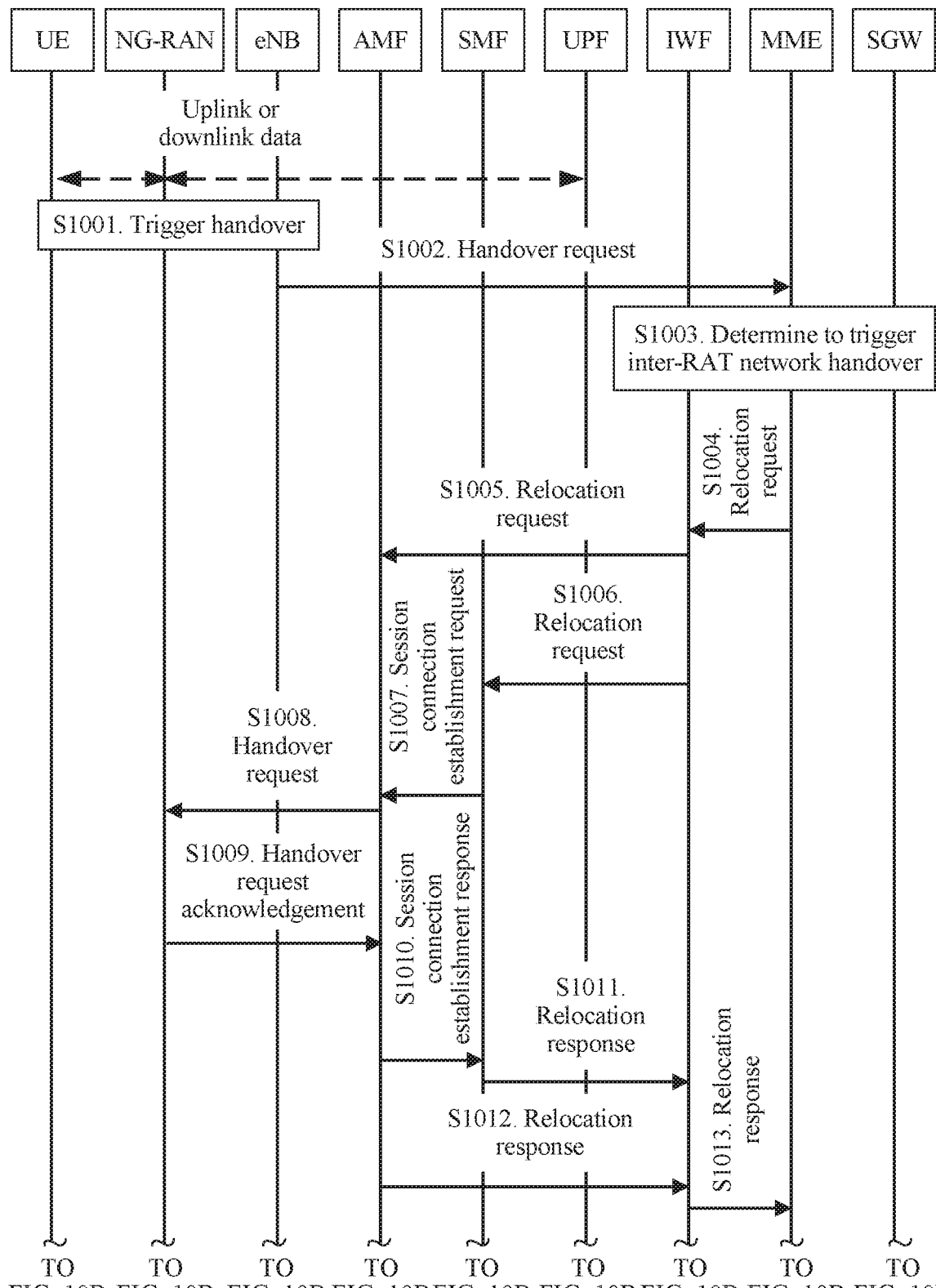
FIG. 10A and FIG. 10B are a schematic flowchart of a network handover method according to an eighth embodiment of this application.
Figure 10B:
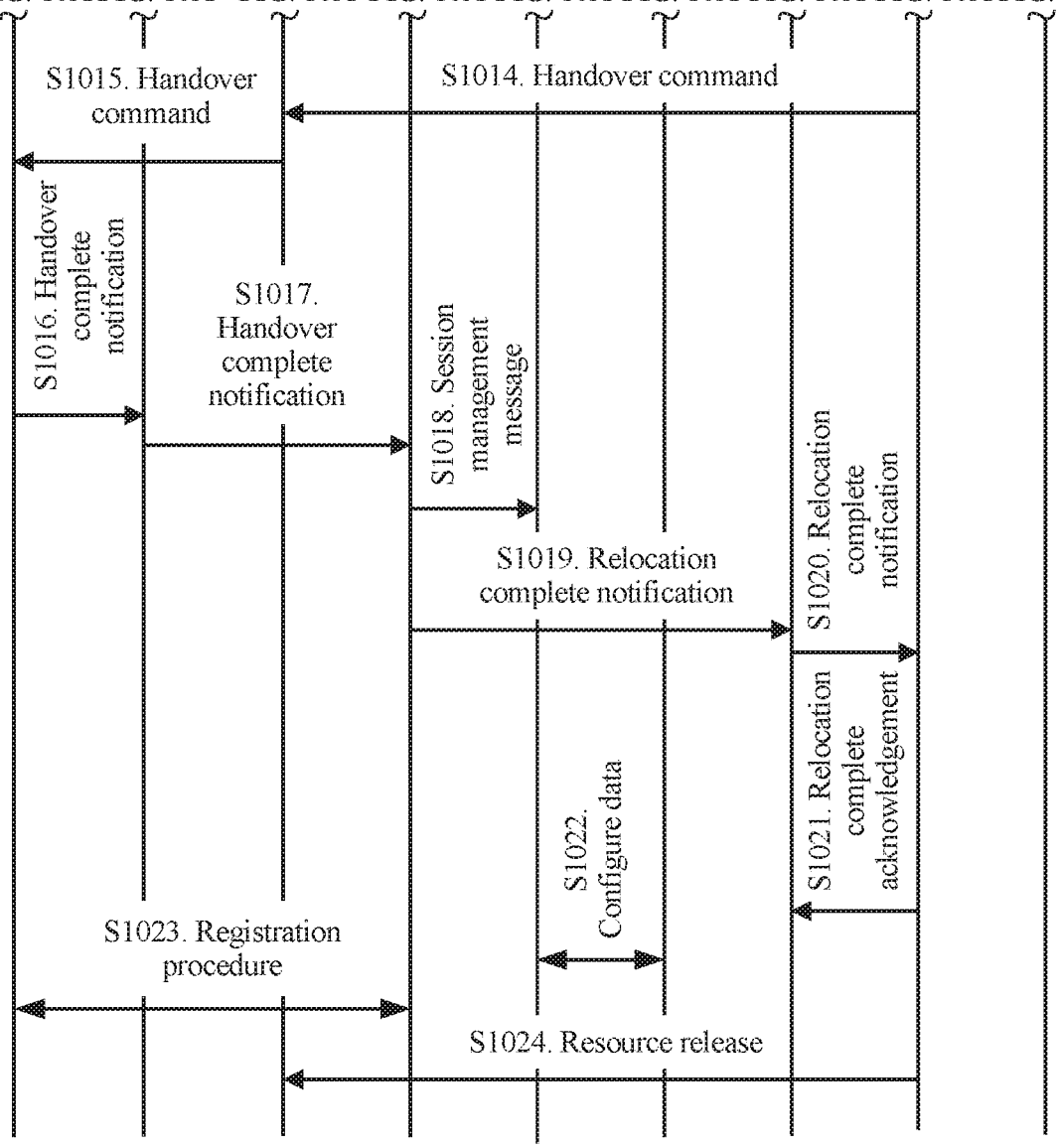

Referring to FIG. 10A and FIG. 10B, FIG. 10A and FIG. 10B are a schematic flowchart of a network handover method according to an eighth embodiment of this application. A process of performing handover from a 4G network (a source system) to a 5G network (a target system) is described in the figure. An NG-RAN, an AMF, and an SMF are devices in the 5G network, and an eNB and an MME are devices in the 4G network. In comparison with that in the second embodiment, a system in this embodiment further includes an inter-working function network element such as an IWF. The IWF is used as an interworking function node for implementing interworking of 5G and 4G, and is responsible for signaling compatibility processing, signaling receiving and sending, and context mapping. As shown in the figure, the method in this embodiment of this application includes the following steps.

S1001. A user terminal such as a UE triggers handover from a source base station such as an eNB to a target radio access network node such as an NG-RAN.

S1002. The source eNB sends, to a source MME, a user terminal handover request that carries a network identifier of the target radio access network node.

S1003. The source MME determines, based on the network identifier of the target radio access network node, to trigger an inter-RAT network handover.

S1004. The source MME sends a relocation request to the IWF.

The relocation request carries a terminal identifier of the user terminal, the network identifier of the target radio access network node, and a context information of the user terminal. The context information of the user terminal includes a mobility management context and a session management context.

S1005. The interworking function network element IWF sends a relocation request to a target mobility management function entity AMF, where the relocation request includes a terminal identifier of the user terminal, the network identifier of the target radio access network node, and a mobility management context.

Optionally, before sending the relocation request to the target AMF, the IWF may map a mobility management context of the source system into a mobility management context of the target system.

S1006. The IWF sends a relocation request to a target session management function entity such as an SMF, where the relocation request includes the terminal identifier of the user terminal, the network identifier of the target radio access network node, and a session management context.

Optionally, before sending the relocation request to the target SMF, the IWF may map a session management context of the source system into a session management context of the target system.

S1007. The target SMF sends a session connection establishment request to the target AMF.

The session connection establishment request carries a session identifier and/or first data channel information, and the first data channel information is used to establish a data transmission channel between a core network user plane function entity and the target radio access network node.

Optionally, the target SMF further receives the network identifier of the target radio access network node from the IWF. Optionally, the target SMF may determine, based on the network identifier of the target radio access network node, that this operation is the inter-RAT network handover.

Optionally, the target SMF further receives the inter-RAT network handover indication and/or the target network access type from the IWF. The target SMF may determine, based on the inter-RAT network handover indication and/or the target network access type, that this operation is the inter-RAT network handover.

Optionally, the target SMF further receives at least one of the network identifier of the target radio access network node, the inter-RAT network handover indication, and the target network access type from the IWF. The target SMF may determine, based on the at least one of the network identifier of the target radio access network node, the inter-RAT network handover indication, and the target network access type, that this operation is the inter-RAT network handover.

S1008. The target AMF sends, to the target NG-RAN, a handover request that carries the session connection establishment request. Alternatively, the target AMF sends a handover request to the target NG-RAN, and sends the session connection establishment request to the target NG-RAN, where the two requests are two different messages, and the handover request is used to instruct the target radio access network node to perform inter-RAT network handover on the user terminal.

S1009. The target NG-RAN sends a handover request acknowledgement to the target AMF. Alternatively, the target NG-RAN sends, to the target AMF, a handover request acknowledgement that carries a session connection establishment response.

It should be noted that, if the session connection establishment request is not included in the handover request sent to the target NG-RAN, and the session connection establishment response is not included in the handover request acknowledgement sent to the target NG-RAN, after receiving the handover request acknowledgement sent by the target NG-RAN, the target AMF may send the session connection establishment request to the target NG-RAN, After receiving the session connection establishment request, the target NG-RAN returns the session connection establishment response to the target AMF.

Optionally, the session connection establishment response carries the session identifier and/or second data channel information, and the second data channel information is used to establish the data transmission channel between the core network user plane function entity and the target radio access network node.

S1010. The target AMF sends the session connection establishment response to the target SMF.

S1011. The target SMF sends a relocation response to the IWF.

S1012. The target AMF sends a relocation response to the IWF.

S1013. The IWF sends a relocation response to the source MME.

S1014. The source MME sends a handover command to the source eNB.

S1015. The source eNB sends the handover command to the UE.

S1016. The UE sends a handover complete notification to the target NG-RAN.

S1017. The target NG-RAN sends a handover complete notification to the target AMF. Optionally, the handover complete notification includes a session management message, the session management message carries the session identifier and/or second data channel information, where the second data channel information is used to establish the data transmission channel between the core network user plane function entity and the target radio access network node.

S1018. The target AMF sends a session management message to the target SMF.

S1019. The target AMF sends a handover complete notification to the IWF.

S1020. The IWF sends a relocation complete notification to the source MME.

S1021. The source MME sends a relocation complete acknowledgement to the IWF.

S1022. A user plane function entity such as a UPF and the target SMF configure data.

S1023. The UE and the target AMF perform a registration procedure.

S1024. The source MME releases a network resource of the source eNB.

It should be noted that, the session identifier and/or the second data channel information are/is carried in only step S1009 or step S1017.

It should be noted that, a sequence of performing the steps in this embodiment of this application may not be limited, and the sequence of performing the steps may be changed.

In the foregoing embodiments, a CU separation architecture including a a control plane PDN gateway (PGW-C) and a a user plane PDN gateway (PGW-U) is used in 4G. During deployment, the PGW-C (4G) and an SMF (5G) are integrated together, and the PGW-U (4G) and a UPF (5G) are disposed together. Therefore, a data anchor point (such as an Internet Protocol (IP) anchor point) remains unchanged during handover between 4G and 5G.

Optionally, during deployment, the PGW-C (4G) and the SMF (5G) may be separately disposed, and the PGW-U (4G) and the UPF (5G) may be separately disposed. Therefore, two network elements such as the PGW-C and the PGW-U need to be added to the foregoing network handover system. In this case, in a process of performing handover from 5G to 4G, a serving gateway (S-GW) sends a bearer modification request to the PGW-C instead of the SMF. The PGW-C (instead of the SMF) sends a bearer modification response to the S-GW. Additionally, the PGW-C and the PGW-U, instead of the SMF and the UPF, update configuration data. For example, the two network elements such as the PGW-C and the PGW-U are added in the first embodiment of this application. In step S319, the S-GW sends the bearer modification request to the PGW-C. In step S320, the PGW-C sends the bearer modification response to the S-GW. In step S321, the PGW-C sends updated configuration data to the PGW-U.

Figure 11:
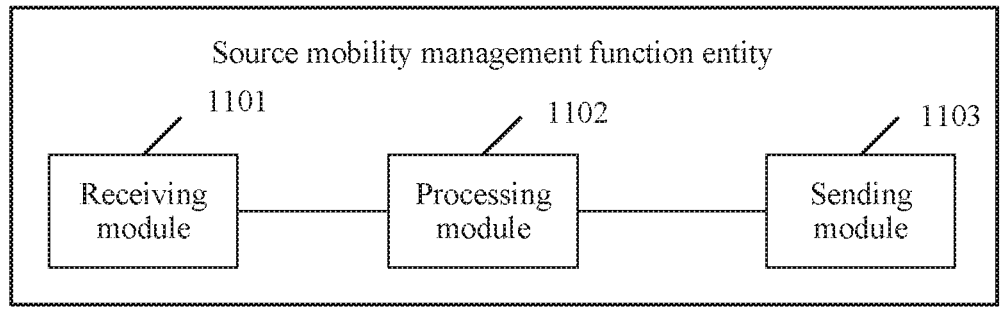
FIG. 11 is a schematic structural diagram of a source mobility management function entity according to an embodiment of this application.

Referring to FIG. 11, FIG. 11 is a schematic structural diagram of a source mobility management function entity according to an embodiment of this application. As shown in the figure, the source mobility management function entity includes a processing module 1101, a sending module 1102, and a receiving module 1103. The processing module 1101, the sending module 1102, and the receiving module 1103 separately perform the methods and functions performed by the source mobility management function entity in the first embodiment to the eighth embodiment. Details are not described again in this embodiment of this application.

Figure 12:
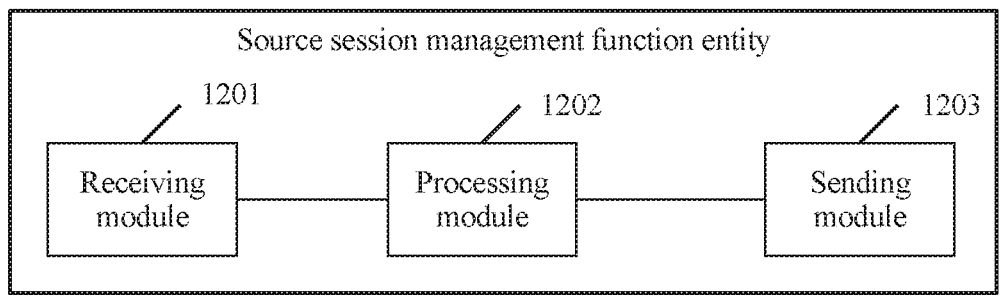
FIG. 12 is a schematic structural diagram of a source session management function entity according to an embodiment of this application.

Referring to FIG. 12, FIG. 12 is a schematic structural diagram of a source session management function entity according to an embodiment of this application. As shown in the figure, a source mobility management function entity includes a processing module 1201, a sending module 1202, and a receiving module 1203. The processing module 1201, the sending module 1202, and the receiving module 1203 separately perform the methods and functions performed by the source session management function entity in the first embodiment to the eighth embodiment. Details are not described again in this embodiment of this application.

Figure 13:
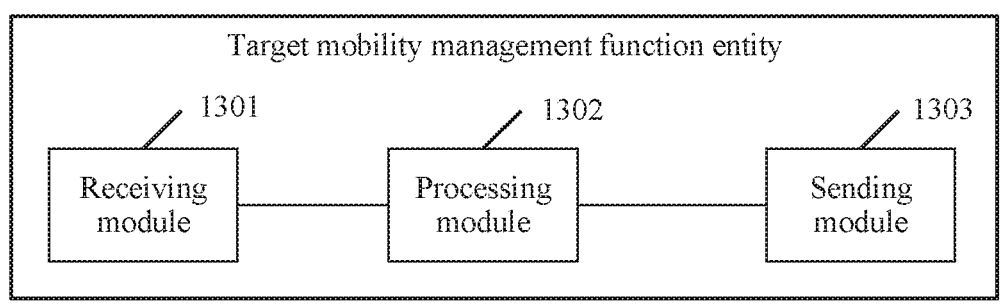
FIG. 13 is a schematic structural diagram of a target mobility management function entity according to an embodiment of this application.

Referring to FIG. 13, FIG. 13 is a schematic structural diagram of a target mobility management function entity according to an embodiment of this application. As shown in the figure, the target mobility management function entity includes a processing module 1301, a sending module 1302, and a receiving module 1303. The processing module 1301, the sending module 1302, and the receiving module 1303 separately perform the methods and functions performed by the target mobility management function entity in the first embodiment to the eighth embodiment. Details are not described again in this embodiment of this application.

Figure 14:
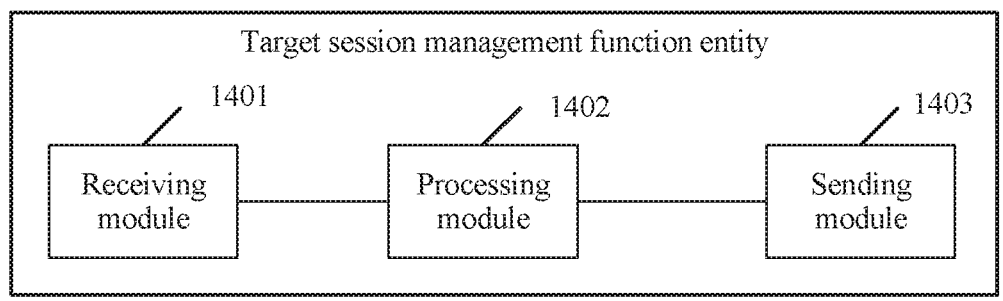
FIG. 14 is a schematic structural diagram of a target session management function entity according to an embodiment of this application.

Referring to FIG. 14, FIG. 14 is a schematic structural diagram of a target session management function entity according to an embodiment of this application. As shown in the figure, a target mobility management function entity includes a processing module 1401, a sending module 1402, and a receiving module 1403. The processing module 1401, the sending module 1402, and the receiving module 1403 separately perform the methods and functions performed by the target session management function entity in the first embodiment to the eighth embodiment. Details are not described again in this embodiment of this application.

Figure 15:
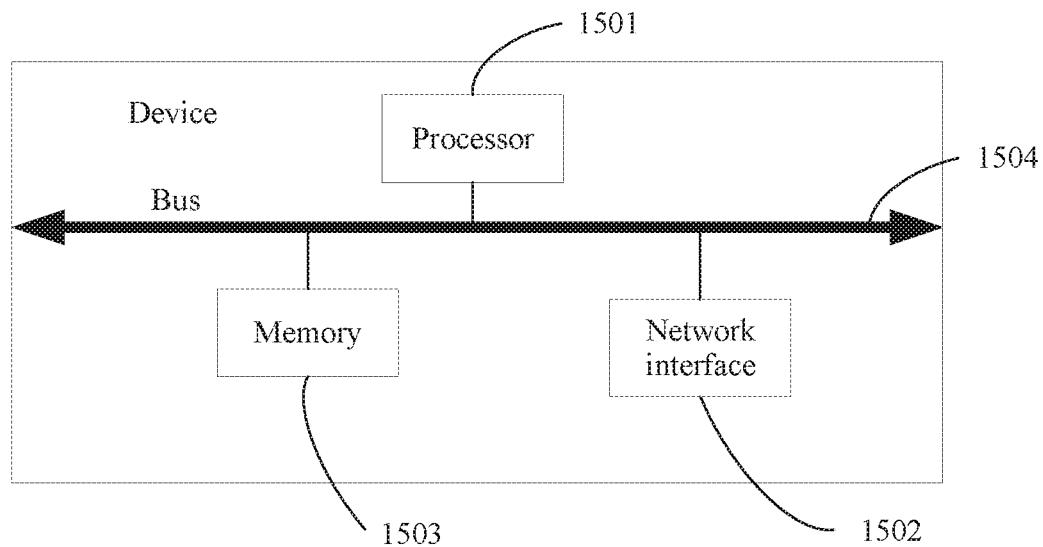
FIG. 15 is a schematic structural diagram of a network handover device according to this application.

Further referring to FIG. 15, FIG. 15 is a schematic structural diagram of a network handover device according to this application. As shown in the figure, the device may include at least one processor 1501 such as a central processing unit (CPU), at least one network interface 1502, at least one memory 1503, and at least one communications bus 1504. The communications bus 1504 is configured to implement connection communication between these components. The network interface 1502 in the device in this embodiment of this application is configured to perform signaling or data communication with another node device. The memory 1503 may be a high-speed Random Access Memory (RAM), or may be a non-volatile memory, such as at least one magnetic disk memory. Optionally, the memory 1503 may be at least one storage apparatus that is far away from the processor 1501. The memory 1503 stores a group of program code, and the processor 1501 executes a program in the memory 1503 that is executed by the foregoing source mobility management function entity.

For example, the processor is configured to invoke the program code to perform the following operations: when receiving a user terminal handover request that is sent by a source radio access network node and that carries a target base station identifier, determining, based on the target base station identifier, to trigger inter-RAT network handover; sending a first message to a source session management function entity using the network interface 1502; receiving, using the network interface 1502, a second message sent by the source session management function entity, where the second message includes a session management context; and sending a relocation request to a target mobility management function entity using the network interface 1502, where the relocation request is used to instruct the target mobility management function entity to perform inter-RAT network handover on the user terminal.

Further, the processor may cooperate with the memory and the network interface, to perform operations performed by the radio access network node in the first embodiment to the eighth embodiment in this application.

Figure 16:
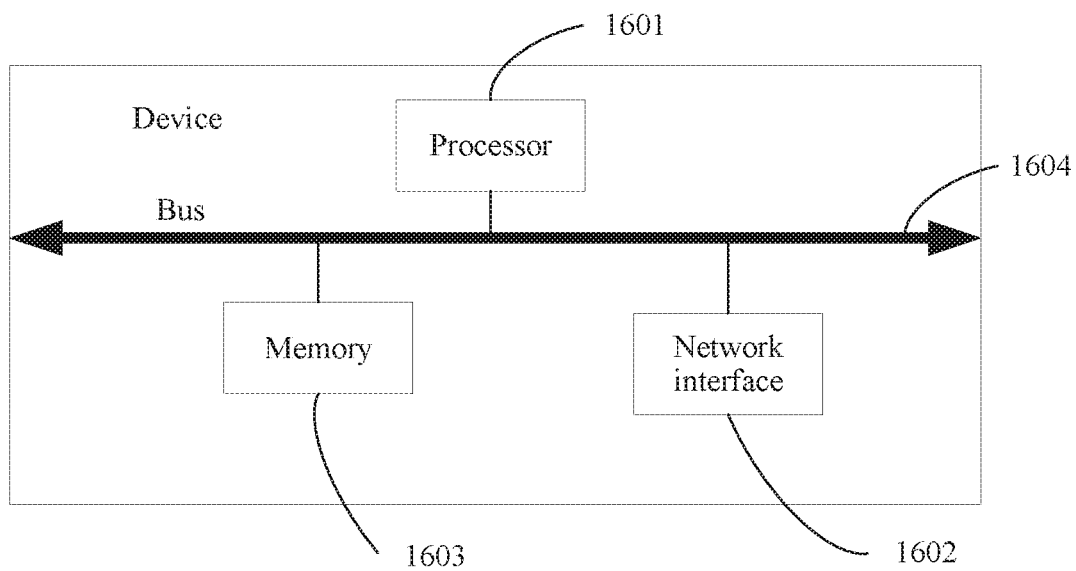
FIG. 16 is a schematic structural diagram of another network handover device according to this application.

Further referring to FIG. 16, FIG. 16 is a schematic structural diagram of a network handover device according to this application. As shown in the figure, the device may include at least one processor 1601 such as a CPU, at least one network interface 1602, at least one memory 1603, and at least one communications bus 1604. The communications bus 1604 is configured to implement connection communication between these components. The network interface 1602 in the device in this embodiment of this application is configured to perform signaling or data communication with another node device. The memory 1603 may be a high-speed RAM memory, or may be a non-volatile memory, such as at least one magnetic disk memory. Optionally, the memory 1603 may be at least one storage apparatus that is far away from the processor 1601. The memory 1603 stores a group of program code, and the processor 1601 executes a program in the memory 1603 that is executed by the foregoing source session management function entity.

For example, the processor is configured to invoke the program code to perform the following operations: receiving, using the network interface 1602, a first message sent by a source mobility management function entity, where the first message is sent by the source mobility management function entity after the source mobility management function entity receives a user terminal handover request that is sent by a source radio access network node and that carries a target base station identifier, and determines, based on the target base station identifier, to trigger inter-RAT network handover; determining, based on the first message, that this operation is the inter-RAT network handover; and sending a second message to the source mobility management function entity using the network interface 1602, where the second message includes a session management context, the second message is used by the source mobility management function entity to send a relocation request to a target mobility management function entity, and the relocation request is used to instruct the target mobility management function entity to perform inter-RAT network handover on the user terminal.

Further, the processor may cooperate with the memory and the network interface, to perform operations performed by the radio access network node in the first embodiment to the eighth embodiment in this application.

Figure 17:
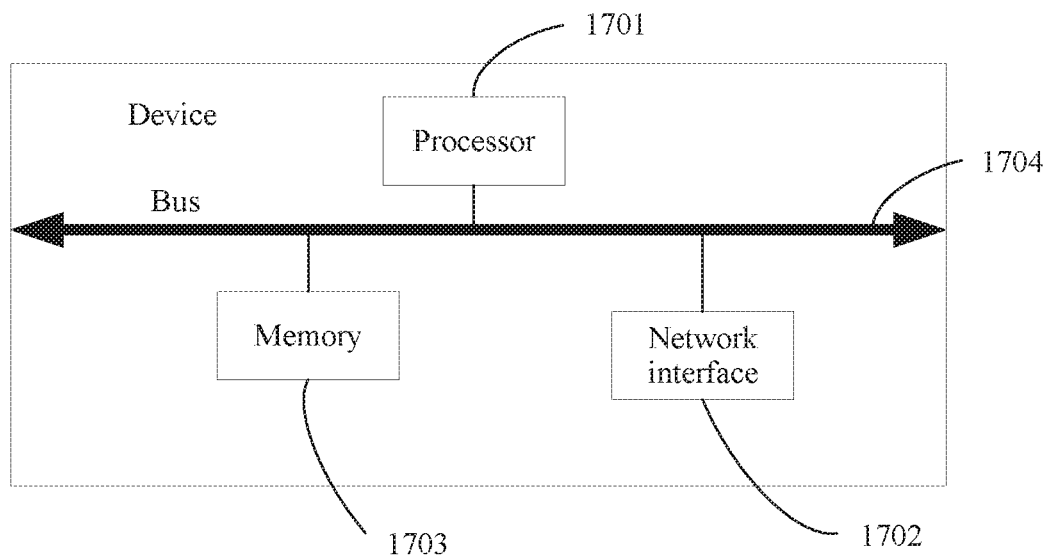
FIG. 17 is a schematic structural diagram of another network handover device according to this application.

Further referring to FIG. 17, FIG. 17 is a schematic structural diagram of a network handover device according to this application. As shown in the figure, the device may include at least one processor 1701 such as a CPU, at least one network interface 1702, at least one memory 1703, and at least one communications bus 1704. The communications bus 1704 is configured to implement connection communication between these components. The network interface 1702 in the device in this embodiment of this application is configured to perform signaling or data communication with another node device. The memory 1703 may be a high-speed RAM memory, or may be a non-volatile memory, such as at least one magnetic disk memory. Optionally, the memory 1703 may be at least one storage apparatus that is far away from the processor 1701. The memory 1703 stores a group of program code, and the processor 1701 executes a program in the memory 1703 that is executed by the foregoing target mobility management function entity.

For example, the processor is configured to invoke the program code to perform the following operations: receiving, using the network interface 1702, a relocation request sent by a source mobility management function entity, where the relocation request is sent by the source mobility management function entity after the source mobility management function entity receives a user terminal handover request that is sent by a source base station and that carries a network identifier of a target radio access network node, and determines, based on the network identifier of the target radio access network node, to trigger inter-RAT network handover; sending a session management context to a target session management function entity using the network interface 1702; receiving, using the network interface 1702, a session connection establishment request sent by the target session management function entity; and sending the session connection establishment request to the target radio access network node using the network interface 1702, where the connection establishment request is used to instruct the target radio access network node to establish a data transmission channel with a core network user plane function entity.

Further, the processor may cooperate with the memory and the network interface, to perform operations performed by the target mobility management function entity in the first embodiment to the eighth embodiment in this application.

Figure 18:
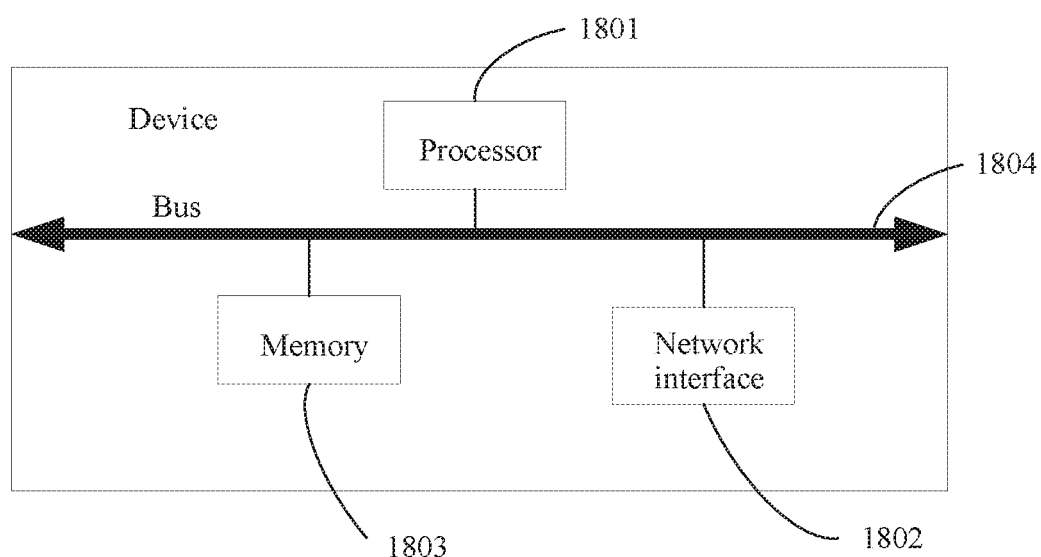
FIG. 18 is a schematic structural diagram of still another network handover device according to this application.

Further referring to FIG. 18, FIG. 18 is a schematic structural diagram of a network handover device according to this application. As shown in the figure, the device may include at least one processor 1801 such as a CPU, at least one network interface 1802, at least one memory 1803, and at least one communications bus 1804. The communications bus 1804 is configured to implement connection communication between these components. The network interface 1802 in the device in this embodiment of this application is configured to perform signaling or data communication with another node device. The memory 1803 may be a high-speed RAM memory, or may be a non-volatile memory, such as at least one magnetic disk memory. Optionally, the memory 1803 may be at least one storage apparatus that is far away from the processor 1801. The memory 1803 stores a group of program code, and the processor 1801 executes a program in the memory 1803 that is executed by the foregoing target session management function entity.

For example, the processor is configured to invoke the program code to perform the following operations: receiving, using the network interface 1802, a session management context sent by a target mobility management function entity, where the session management context is sent by the target mobility management function entity after the target mobility management function entity receives a relocation request sent by a source mobility management function entity; and sending a session connection establishment request to the target mobility management function entity using the network interface 1802, and forwarding, by the target mobility management function entity, the session connection establishment request to the target radio access network node, where the connection establishment request is used to instruct the target radio access network node to establish a data transmission channel with a core network user plane function entity.

Further, the processor may cooperate with the memory and the network interface, to perform operations performed by the target mobility management function entity in the first embodiment to the eighth embodiment in this application.

It should be noted that, for brief description, the foregoing method embodiments are represented as a series of actions. However, a person skilled in the art should appreciate that this application is not limited to the described order of the actions, because according to this application, some steps may be performed in other orders or simultaneously. It should be further appreciated by a person skilled in the art that the embodiments described in this specification all belong to example embodiments, and the involved actions and modules are not necessarily required by this application.

In the foregoing embodiments, the descriptions of the embodiments have respective focuses. For a part that is not described in detail in an embodiment, refer to related descriptions in other embodiments.

A person of ordinary skill in the art may understand that all or some of the steps of the methods in the embodiments may be implemented by a program instructing relevant hardware. The program may be stored in a computer readable storage medium. The storage medium may include a flash memory, a read-only memory (ROM), a random access memory (RAM), a magnetic disk, an optical disc, or the like.

The foregoing describes in detail the network handover method, the related device, and the system provided in the embodiments of this application. In this specification, various examples are used to describe the principles and implementations of this application, and the description of the embodiments is only intended to help understand the method and core idea of this application. In addition, a person of ordinary skill in the art may, based on the ideas of this application, make modifications with respect to the various implementations and the application scope. Therefore, the content of this specification shall not be construed as a limitation to this application.

What is claimed is:

1. A network handover method, comprising:
receiving, by a source mobility management function entity in a source system from a source radio access network node in the source system, a user terminal handover required message that carries a target base station identifier in a target system;
determining, by the source mobility management function entity based on the target base station identifier, to trigger a handover of a user terminal from the source system to the target system;
sending, by the source mobility management function entity, a first message for requesting a session management context to a source session management function entity in the source system;
receiving, by the source mobility management function entity, a second message from the source session management function entity, wherein the second message comprises a session management context of the user terminal in the target system; and
sending, by the source mobility management function entity, a relocation request to a target mobility management function entity in the target system, wherein the relocation request is used to instruct to perform the handover on the user terminal, wherein the relocation request carries the target base station identifier, the session management context of the user terminal in the target system, and a mobility management context of the user terminal in the target system, wherein the source system is a $5^{th}$ generation (5G) network, and wherein the target system is a $4^{th}$ generation (4G) network.

2. The network handover method according to claim 1, wherein the first message comprises a 5G-to-4G network handover indication, and the 5G-to-4G network handover indication is for determining that an operation is a 5G-to-4G network handover.

3. The network handover method according to claim 1, wherein before sending, by the source mobility management function entity, the relocation request to the target mobility management function entity, the method further comprises:

obtaining, by the source mobility management function entity, a mobility management context of the user terminal in the source system; and
mapping, by the source mobility management function entity, the mobility management context of the user terminal in the source system to the mobility management context of the user terminal in the target system.

4. A network handover device, comprising:
a memory; and
a processor coupled to the memory and configured to execute instructions stored on the memory such that when executed by the processor, cause the network handover device to:
receive, from a source radio access network node in a source system, a user terminal handover required message that carries a target base station identifier in a target system;
determine, based on the target base station identifier, to trigger a handover of a user terminal from the source system to the target system;
send a first message for requesting a session management context to a source session management function entity in the source system;
receive a second message from the source session management function entity, wherein the second message comprises a session management context of the user terminal in the target system; and
send a relocation request to a target mobility management function entity in the target system, wherein the relocation request is used to instruct to perform the handover on the user terminal,
wherein the relocation request carries the target base station identifier, the session management context of the user terminal in the target system, and a mobility management context of the user terminal in the target system, wherein the source system is a $5^{th}$ generation (5G) network, and wherein the target system is a $4^{th}$ generation (4G) network.

5. The network handover device according to claim 4, wherein the first message comprises a 5G-to-4G network handover indication, and the 5G-to-4G network handover indication is for determining that an operation is a 5G-to-4G network handover.

6. The network handover device according to claim 4, wherein before sending the relocation request to the target mobility management function entity, the network handover device is configured to:
obtain a mobility management context of the user terminal in the source system; and
map the mobility management context of the user terminal in the source system to the mobility management context of the user terminal in the target system.

7. A method, comprising:
receiving, by a source mobility management function entity in a source system from a source radio access network node in the source system, a user terminal handover required message that carries a target base station identifier in a target system;
determining, by the source mobility management function entity based on the target base station identifier, to trigger a handover of a user terminal from the source system to the target system;
sending, by the source mobility management function entity, a first message for requesting a session management context to a source session management function entity in the source system;

sending, by the source session management function entity, a second message to the source mobility management function entity, wherein the second message comprises a session management context of the user terminal in the target system; and sending, by the source mobility management function entity, a relocation request to a target mobility management function entity in the target system, wherein the relocation request is used to instruct to perform the handover on the user terminal, wherein the relocation request carries the target base station identifier, the session management context of the user terminal in the target system, and a mobility management context of the user terminal in the target system, wherein the source system is a $5^{th}$ generation (5G) network, and wherein the target system is a $4^{th}$ generation (4G) network.

8. The method according to claim 7, wherein the first message comprises a 5G-to-4G network handover indication.

9. The method according to claim 8, further comprising determining, by the source session management function entity, that the handover is a 5G-to-4G network handover based on the 5G-to-4G network handover indication.

10. The method according to claim 9, further comprising:
obtaining, by the source session management function entity, a session management context of the user terminal in the source system; and
mapping, by the source session management function entity, the session management context of the user terminal in the source system to the session management context of the user terminal in the target system.

11. The method according to claim 10, further comprising:
obtaining, by the source mobility management function entity, a mobility management context of the user terminal in the source system; and
mapping, by the source mobility management function entity, the mobility management context of the user terminal in the source system to the mobility management context of the user terminal in the target system.

12. A system, comprising:
a source mobility management function entity in a source system, wherein the source mobility management function entity is configured to:
receive, from a source radio access network node in the source system, a user terminal handover required message that carries a target base station identifier in a target system;
determine based on the target base station identifier to trigger a handover of a user terminal from the source system to the target system; and
send a first message for requesting a session management context; and
a source session management function entity in the source system, wherein the source session management function entity is configured to send a second message to the source mobility management function entity, wherein the second message comprises a session management context of the user terminal in the target system,
wherein the source mobility management function entity is further configured to send a relocation request to a target mobility management function entity in the target system, wherein the relocation request is used to instruct to perform the handover on the user terminal, wherein the relocation request carries the target base station identifier, the session management context of the user terminal in the target system, and a mobility management context of the user terminal in the target system, wherein the source system is a $5^{th}$ generation (5G) network, and wherein the target system is a $4^{th}$ generation (4G) network.

13. The system according to claim 12, wherein the first message comprises a 5G-to-4G network handover indication.

14. The system according to claim 13, wherein the source session management function entity is further configure to determine that the handover is a 5G-to-4G network handover based on the 5G-to-4G network handover indication.

15. The system according to claim 14, wherein the source session management function entity is further configured to:
obtain a session management context of the user terminal in the source system; and
map the session management context of the user terminal in the source system to the session management context of the user terminal in the target system.

16. The system according to claim 15, wherein the source mobility management function entity is further configured to:
obtain a mobility management context of the user terminal in the source system; and
map the mobility management context of the user terminal in the source system to the mobility management context of the user terminal in the target system.

17. A non-transitory computer readable storage medium storing an instruction, which when executed by a processor, causes an apparatus comprising the processor to:
receive, from a source radio access network node in a source system, a user terminal handover required message that carries a target base station identifier in a target system;
determine, based on the target base station identifier, to trigger a handover of a user terminal from the source system to the target system;
send a first message for requesting a session management context to a source session management function entity in the source system;
receive a second message from the source session management function entity, wherein the second message comprises a session management context of the user terminal in the target system; and
send a relocation request to a target mobility management function entity in the target system, wherein the relocation request is used to instruct to perform the handover on the user terminal, wherein the relocation request carries the target base station identifier, the session management context of the user terminal in the target system, and a mobility management context of the user terminal in the target system, wherein the source system is a $5^{th}$ generation (5G) network, and wherein the target system is a $4^{th}$ generation (4G) network.

18. The non-transitory computer readable storage medium according to claim 17, wherein the instruction, when executed by the processor, further causes the apparatus to:
obtain a mobility management context of the user terminal in the source system; and
map the mobility management context of the user terminal in the source system to the mobility management context of the user terminal in the target system.

19. The non-transitory computer readable storage medium according to claim 17, wherein the first message comprises a 5G-to-4G network handover indication, and wherein the 5G-to-4G network handover indication is for the source session management function entity to determine that the handover is a 5G-to-4G network handover.

\* \* \* \* \*